United States Patent
Hahn et al.

(10) Patent No.: US 12,557,120 B2
(45) Date of Patent: Feb. 17, 2026

(54) METHOD AND APPARATUS FOR TRANSMITTING AND RECEIVING SIDELINK DATA IN COMMUNICATION SYSTEM

(71) Applicants: Hyundai Motor Company, Seoul (KR); Kia Motors Corporation, Seoul (KR); Wonkwang University Center For Industry-Academy Cooperation, Jeollabuk-do (KR)

(72) Inventors: Gene Back Hahn, Gyeonggi-do (KR); In Yong Jung, Gyeonggi-do (KR); Hyuk Min Son, Jeollabuk-do (KR)

(73) Assignees: Hyundai Motor Company, Seoul (KR); Kia Motors Corporation, Seoul (KR); Wonkwang University Center for Industry-Academy Cooperation, Jeollabuk-do (KR)

( * ) Notice: Subject to any disclaimer, the term of this patent is extended or adjusted under 35 U.S.C. 154(b) by 773 days.

(21) Appl. No.: 17/277,144

(22) PCT Filed: Dec. 24, 2020

(86) PCT No.: PCT/KR2020/019150
§ 371 (c)(1),
(2) Date: Mar. 1, 2023

(87) PCT Pub. No.: WO2021/145585
PCT Pub. Date: Jul. 22, 2021

(65) Prior Publication Data
US 2023/0199801 A1 Jun. 22, 2023

Related U.S. Application Data

(60) Provisional application No. 62/960,372, filed on Jan. 13, 2020.

(51) Int. Cl.
H04W 72/25 (2023.01)
H04L 5/00 (2006.01)

(52) U.S. Cl.
CPC ........... *H04W 72/25* (2023.01); *H04L 5/0051* (2013.01)

(58) Field of Classification Search
CPC .............................. H04W 72/25; H04L 5/0051
See application file for complete search history.

(56) References Cited

U.S. PATENT DOCUMENTS

2020/0351827 A1* 11/2020 Chae ...................... H04L 5/0023
2021/0044399 A1* 2/2021 Wang .................... H04L 5/0048
(Continued)

FOREIGN PATENT DOCUMENTS

KR 10-2019-0139624 A 12/2019

OTHER PUBLICATIONS

R1-1910179, "RS design and other physical layer design issues for NR V2X sidelink", 3GPP TSG RAN WG1 #98b, Chongqing, China, Oct. 14-20, 2019, 18 pages.
(Continued)

*Primary Examiner* — Duc C Ho
(74) *Attorney, Agent, or Firm* — Fox Rothschild LLP

(57) ABSTRACT

Disclosed are a method and an apparatus for transmitting and receiving sidelink data in a communication system. Then operation method of a first terminal includes generating a first stage SCI including first information indicating a number of layers for transmission of sidelink data and transmitting the first stage SCI to a second terminal. The sidelink data is then transmitted to the second terminal through one or more layers indicated by the first information included in the first stage SCI.

18 Claims, 5 Drawing Sheets

(56) References Cited

U.S. PATENT DOCUMENTS

| | | | |
|---|---|---|---|
| 2021/0083704 A1* | 3/2021 | Liao | H04W 72/23 |
| 2021/0112525 A1* | 4/2021 | Sarkis | H04W 72/40 |
| 2021/0136783 A1* | 5/2021 | Fakoorian | H04W 76/14 |

OTHER PUBLICATIONS

R1-1910512, "Discussion of physical layer structure for sidelink" 3GPP TSG RAN WG1 #98bis, Chongqing, China, Oct. 14-20, 2019, 18 pages.

R1-1911713 (Revision of R1-1911643), "Feature lead summary#3 on Resource allocation for NR sidelink Mode 1", 3GPP TSG-RAN WG1 Meeting #98bis, Chongqing, China, Oct. 14-20, 2019, 53 pages.

R1-1912615, "Physical layer structure for NR sidelink", 3GPP TSG RAN WG1 #99, Reno, USA, Nov. 18-22, 2019, 9 pages.

"Discussion of physical layer structure for sidelink", Agenda item 7.2.4.1, 3GPP TSG RAN WG1 #98bis, R1-1910512, Chongqing, China, Oct. 14-20, 2019, Nokia, Nokia Shanghai Bell, 19 pages.

"Feature lead summary#3 on Resource allocation for NR sidelink Mode 1", Agenda Item: 7.2.4.2.1, 3GPP TSG-RAN WG1 Meeting #98bis, R1-1911713, Chongqing, China, Oct. 14-20, 2019, Ericsson, 53 pages.

* cited by examiner

METHOD AND APPARATUS FOR TRANSMITTING AND RECEIVING SIDELINK DATA IN COMMUNICATION SYSTEM

CROSS-REFERENCE TO RELATED APPLICATIONS

This application is a National Phase application filed under 35 USC 371 of PCT International Application No. PCT/KR2020/019150 with an International Filing Date of Dec. 24, 2020, which claims the benefit of U.S. Provisional Application 62/960,372 filed on Jan. 13, 2020. The entire contents of these applications are incorporated herein by reference in their entirety.

TECHNICAL FIELD

The present disclosure relates to a sidelink communication technique, and more specifically, to a technique for configuring and signaling control information required for transmission of sidelink data.

BACKGROUND ART

A fifth-generation (5G) communication system (e.g., New Radio (NR) communication system) which uses a frequency band higher than a frequency band of a fourth-generation (4G) communication system (e.g., Long Term Evolution (LTE) communication system or LTE-Advanced (LTE-A) communication system) as well as the frequency band of the 4G communication system has been considered for processing of wireless data. The 5G communication system can support Enhanced Mobile Broadband (eMBB) communications, Ultra-Reliable and Low-Latency communications (URLLC), massive Machine Type Communications (mMTC), and the like.

The 4G communication system and 5G communication system can support Vehicle-to-Everything (V2X) communications. The V2X communications supported in a cellular communication system, such as the 4G communication system, the 5G communication system, and the like, may be referred to as "Cellular-V2X (C-V2X) communications." The V2X communications (e.g., C-V2X communications) may include Vehicle-to-Vehicle (V2V) communications, Vehicle-to-Infrastructure (V2I) communications, Vehicle-to-Pedestrian (V2P) communication, Vehicle-to-Network (V2N) communication, and the like.

In the cellular communication systems, the V2X communications (e.g., C-V2X communications) may be performed based on "sidelink" communication technologies (e.g., Proximity-based Services (ProSe) communication technology, Device-to-Device (D2D) communication technology, or the like). For example, sidelink channels for vehicles participating in V2V communications can be established, and communications between the vehicles can be performed using the sidelink channels. The sidelink communication may be performed using configured grant (CG) resources. The CG resources may be configured periodically, and periodic data (e.g., periodic sidelink data) may be transmitted using the CG resources.

Meanwhile, information elements required for transmission of sidelink data may be configured by higher layer signaling, and specific information element(s) may be indicated by sidelink control information (SCI). In order to support transmission of sidelink data using one or more layers, a method of configuring layer(s) for sidelink communication and a signaling method therefor are required.

SUMMARY

An objective of the present disclosure for solving the above-described problem is to provide methods for configuring and signaling information element(s) required for transmission of sidelink data.

An operation method of a first terminal, according to a first exemplary embodiment of the present disclosure for achieving the objective, may comprise: generating a first stage sidelink control information (SCI) including first information indicating a number of layers for transmission of sidelink data; transmitting the first stage SCI to a second terminal; and transmitting the sidelink data to the second terminal through one or more layers indicated by the first information included in the first stage SCI, wherein the first information set to a first value indicates one layer, and the first information set to a second value indicates two layers.

The number indicated by the first information may correspond to a number of demodulation reference signal (DMRS) ports for the sidelink data. The operation method may further comprise receiving, from the base station, information of a first table indicating a number of layers supported in sidelink communication, wherein the first information indicates the number selected from the first table. The operation method may further comprise transmitting a second stage SCI to the second terminal through the one or more layers indicated by the first information included in the first stage SCI.

The first stage SCI may further include second information indicating a transmission scheme of a second stage SCI, and a transmission scheme of the sidelink data may be identical to the transmission scheme indicated by the second information. The first stage SCI may further include second information indicating a transmission scheme of a second stage SCI and third information indicating a transmission scheme of the sidelink data, and the second information may be configured independently of the third information. The first stage SCI may further include fourth information indicating both of a transmission scheme of a second stage SCI and a transmission scheme of the sidelink data.

The operation method may further comprise transmitting, to the second terminal, a second stage SCI including third information indicating a transmission scheme of the sidelink data, wherein the sidelink data is transmitted based on the transmission scheme indicated by the third information. An operation method of a second terminal, according to a second exemplary embodiment of the present disclosure for achieving the objective, may comprise: receiving a first stage sidelink control information (SCI) from a first terminal; identifying a number of layers for transmission of sidelink data, which is indicated by first information included in the first stage SCI; and receiving the sidelink data from the first terminal through one or more layers indicated by the first information included in the first stage SCI, wherein the first information set to a first value indicates one layer, and the first information set to a second value indicates two layers.

The number indicated by the first information may correspond to a number of demodulation reference signal (DMRS) ports for the sidelink data. The operation method may further comprise receiving from the base station information of a first table indicating a number of layers supported in sidelink communication, wherein the number indicated by the first information belongs to the first table.

The operation method may further comprise receiving a second stage SCI from the first terminal through the one or more layers indicated by the first information included in the first stage SCI.

The first stage SCI may further include second information indicating a transmission scheme of a second stage SCI, and a transmission scheme of the sidelink data may be identical to the transmission scheme indicated by the second information. The first stage SCI may further include second information indicating a transmission scheme of a second stage SCI and third information indicating a transmission scheme of the sidelink data, and the second information may be configured independently of the third information.

A first terminal, according to a third exemplary embodiment of the present disclosure for achieving the objective, may comprise a processor; and a memory storing at least one instruction executable by the processor, wherein the at least one instruction causes the first terminal to: generate a first stage sidelink control information (SCI) including first information indicating a number of layers for transmission of sidelink data; transmit the first stage SCI to a second terminal; and transmit the sidelink data to the second terminal through one or more layers indicated by the first information included in the first stage SCI, wherein the first information set to a first value indicates one layer, and the first information set to a second value indicates two layers.

The number indicated by the first information may correspond to a number of demodulation reference signal (DMRS) ports for the sidelink data. The at least one instruction may further cause the first terminal to receive, from the base station, information of a first table indicating a number of layers supported in sidelink communication, wherein the first information indicates the number selected from the first table.

The at least one instruction may further cause the first terminal to receive, from the base station, information of a second table indicating transmission schemes supported in sidelink communication, wherein the first stage SCI further includes second information indicating a transmission scheme selected from the second table. The second information may indicate a transmission scheme of a second stage SCI, and a transmission scheme of the sidelink data may be identical to the transmission scheme indicated by the second information. The second information may indicate a transmission scheme of the sidelink data, and the sidelink data may be transmitted based on the transmission scheme indicated by the second information.

According to the present disclosure, a first terminal (e.g., transmitting terminal) may transmit sidelink control information (SCI) including information indicating a transmission scheme and/or the number of layers for sidelink communication to a second terminal (e.g., receiving terminal). The sidelink communication between the first terminal and the second terminal may be performed according to the transmission scheme indicated by the SCI. In addition, the sidelink communication may be performed through one or more layers indicated by the SCI. Therefore, the performance of the communication system can be improved.

DETAILED DESCRIPTION

Figure 1:
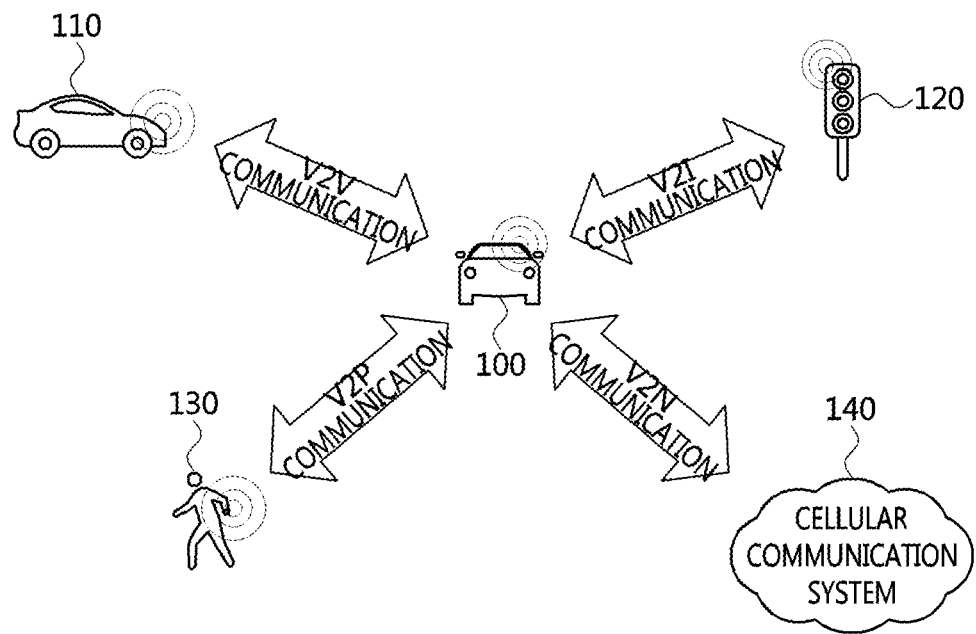
FIG. 1 is a conceptual diagram illustrating V2X communication scenarios.

While the present invention is susceptible to various modifications and alternative forms, specific embodiments are shown by way of example in the drawings and described in detail. It should be understood, however, that the description is not intended to limit the present invention to the specific embodiments, but, on the contrary, the present invention is to cover all modifications, equivalents, and alternatives that fall within the spirit and scope of the present invention.

Although the terms "first," "second," etc. may be used herein in reference to various elements, such elements should not be construed as limited by these terms. These terms are only used to distinguish one element from another. For example, a first element could be termed a second element, and a second element could be termed a first element, without departing from the scope of the present invention. The term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directed coupled" to another element, there are no intervening elements.

The terminology used herein is for the purpose of describing particular embodiments only and is not intended to be limiting of embodiments of the present invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, parts, and/or combinations thereof, but do not preclude the presence or addition of one or more other features, integers, steps, operations, elements, parts, and/or combinations thereof.

Unless otherwise defined, all terms (including technical and scientific terms) used herein have the same meaning as commonly understood by those of ordinary skill in the art to which the present invention pertains. It will be further understood that terms defined in commonly used dictionaries should be interpreted as having a meaning that is consistent with their meaning in the context of the related art and will not be interpreted in an idealized or overly formal sense unless expressly so defined herein.

Hereinafter, preferred exemplary embodiments of the present invention will be described in detail with reference to the accompanying drawings. In describing the present invention, to facilitate the entire understanding, like numbers refer to like elements throughout the description of the figures and the repetitive description thereof will be omitted.

FIG. 1 is a conceptual diagram illustrating V2X communication scenarios. As shown in FIG. 1, the V2X communications may include Vehicle-to-Vehicle (V2V) communications, Vehicle-to-Infrastructure (V2I) communications, Vehicle-to-Pedestrian (V2P) communications, Vehicle-to-Network (V2N) communications, and the like. The V2X communications may be supported by a cellular communication system (e.g., a cellular communication system 140), and the V2X communications supported by the cellular communication system 140 may be referred to as "Cellular-V2X (C-V2X) communications." Here, the cellular communication system 140 may include the 4G communication system (e.g., LTE communication system or LTE-A communication system), the 5G communication system (e.g., NR communication system), and the like.

The V2V communications may include communications between a first vehicle 100 (e.g., a communication node located in the vehicle 100) and a second vehicle 110 (e.g., a communication node located in the vehicle 110). Various driving information such as velocity, heading, time, position, and the like may be exchanged between the vehicles 100 and 110 through the V2V communications. For example, autonomous driving (e.g., platooning) may be supported based on the driving information exchanged through the V2V communications. The V2V communications supported in the cellular communication system 140 may be performed based on "sidelink" communication technologies (e.g., ProSe and D2D communication technologies, and the like). In particular, the communications between the vehicles 100 and 110 may be performed using at least one sidelink channel established between the vehicles 100 and 110.

The V2I communications may include communications between the first vehicle 100 (e.g., the communication node located in the vehicle 100) and an infrastructure (e.g., road side unit (RSU)) 120 located on a roadside. The infrastructure 120 may also include a traffic light or a street light which is located on the roadside. For example, when the V2I communications are performed, the communications may be performed between the communication node located in the first vehicle 100 and a communication node located in a traffic light. Traffic information, driving information, and the like may be exchanged between the first vehicle 100 and the infrastructure 120 through the V2I communications. The V2I communications supported in the cellular communication system 140 may also be performed based on sidelink communication technologies (e.g., ProSe and D2D communication technologies, and the like). In particular, the communications between the vehicle 100 and the infrastructure 120 may be performed using at least one sidelink channel established between the vehicle 100 and the infrastructure 120.

The V2P communications may include communications between the first vehicle 100 (e.g., the communication node located in the vehicle 100) and a person 130 (e.g., a communication node carried by the person 130). The driving information of the first vehicle 100 and movement information of the person 130 such as velocity, heading, time, position, and the like may be exchanged between the vehicle 100 and the person 130 via the V2P communications. The communication node located in the vehicle 100 or the communication node carried by the person 130 may be configured to generate an alarm indicating a danger by judging a dangerous situation based on the obtained driving information and movement information. The V2P communications supported in the cellular communication system 140 may be performed based on sidelink communication technologies (e.g., ProSe and D2D communication technologies, and the like). Particularly, the communications between the communication node located in the vehicle 100 and the communication node carried by the person 130 may be performed using at least one sidelink channel established between the communication nodes.

The V2N communications may be communications between the first vehicle 100 (e.g., the communication node located in the vehicle 100) and a server connected via the cellular communication system 140. The V2N communications may be performed based on the 4G communication technology (e.g., LTE or LTE-A) or the 5G communication technology (e.g., NR). Additionally, the V2N communications may be performed based on a Wireless Access in Vehicular Environments (WAVE) communication technology or a Wireless Local Area Network (WLAN) communication technology which is defined in Institute of Electrical and Electronics Engineers (IEEE) 802.11, or a Wireless Personal Area Network (WPAN) communication technology defined in IEEE 802.15.

Figure 2:
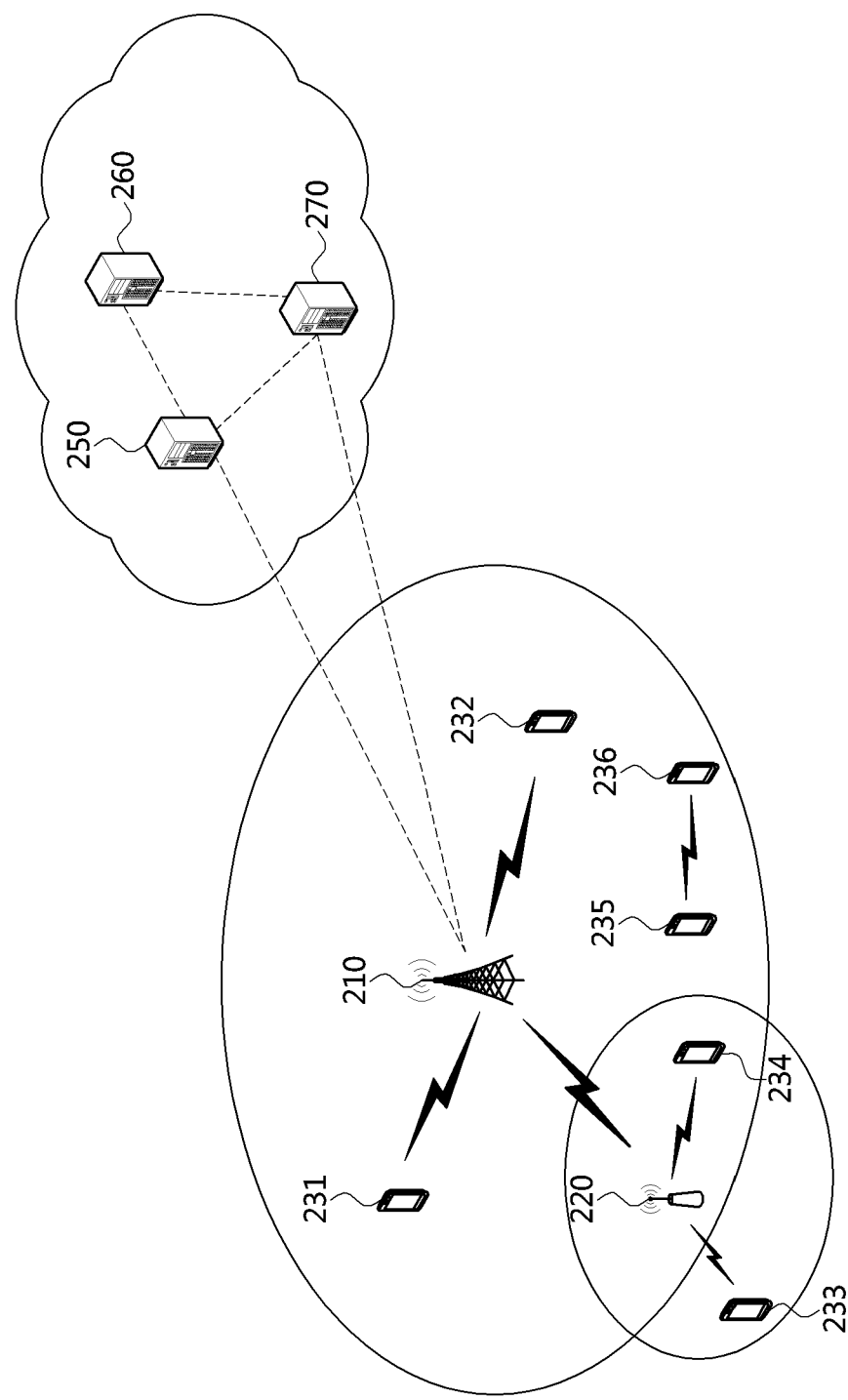
FIG. 2 is a conceptual diagram illustrating an exemplary embodiment of a cellular communication system.

Meanwhile, the cellular communication system 140 supporting the V2X communications may be configured as follows. FIG. 2 is a conceptual diagram illustrating an exemplary embodiment of a cellular communication system.

As shown in FIG. 2, a cellular communication system may include an access network, a core network, and the like. The access network may include a base station 210, a relay 220, User Equipments (UEs) 231 through 236, and the like. The UEs 231 through 236 may include communication nodes located in the vehicles 100 and 110 of FIG. 1, the communication node located in the infrastructure 120 of FIG. 1, the communication node carried by the person 130 of FIG. 1, and the like. When the cellular communication system supports the 4G communication technology, the core network may include a serving gateway (S-GW) 250, a packet data network (PDN) gateway (P-GW) 260, a mobility management entity (MME) 270, and the like.

When the cellular communication system supports the 5G communication technology, the core network may include a user plane function (UPF) 250, a session management function (SMF) 260, an access and mobility management function (AMF) 270, and the like. Alternatively, when the cellular communication system operates in a Non-Stand Alone (NSA) mode, the core network constituted by the S-GW 250, the P-GW 260, and the MME 270 may support the 5G communication technology as well as the 4G communication technology, or the core network constituted by the UPF 250, the SMF 260, and the AMF 270 may support the 4G communication technology as well as the 5G communication technology.

Additionally, when the cellular communication system supports a network slicing technique, the core network may be divided into a plurality of logical network slices. For example, a network slice supporting V2X communications (e.g., a V2V network slice, a V2I network slice, a V2P network slice, a V2N network slice, etc.) may be configured, and the V2X communications may be supported through the V2X network slice configured in the core network.

The communication nodes (e.g., base station, relay, UE, S-GW, P-GW, MME, UPF, SMF, AMF, etc.) comprising the cellular communication system may be configured to perform communications by using at least one communication technology among a code division multiple access (CDMA) technology, a time division multiple access (TDMA) technology, a frequency division multiple access (FDMA) technology, an orthogonal frequency division multiplexing (OFDM) technology, a filtered OFDM technology, an orthogonal frequency division multiple access (OFDMA) technology, a single carrier FDMA (SC-FDMA) technology, a non-orthogonal multiple access (NOMA) technology, a generalized frequency division multiplexing (GFDM) technology, a filter bank multi-carrier (FBMC) technology, a universal filtered multi-carrier (UFMC) technology, and a space division multiple access (SDMA) technology.

Figure 3:
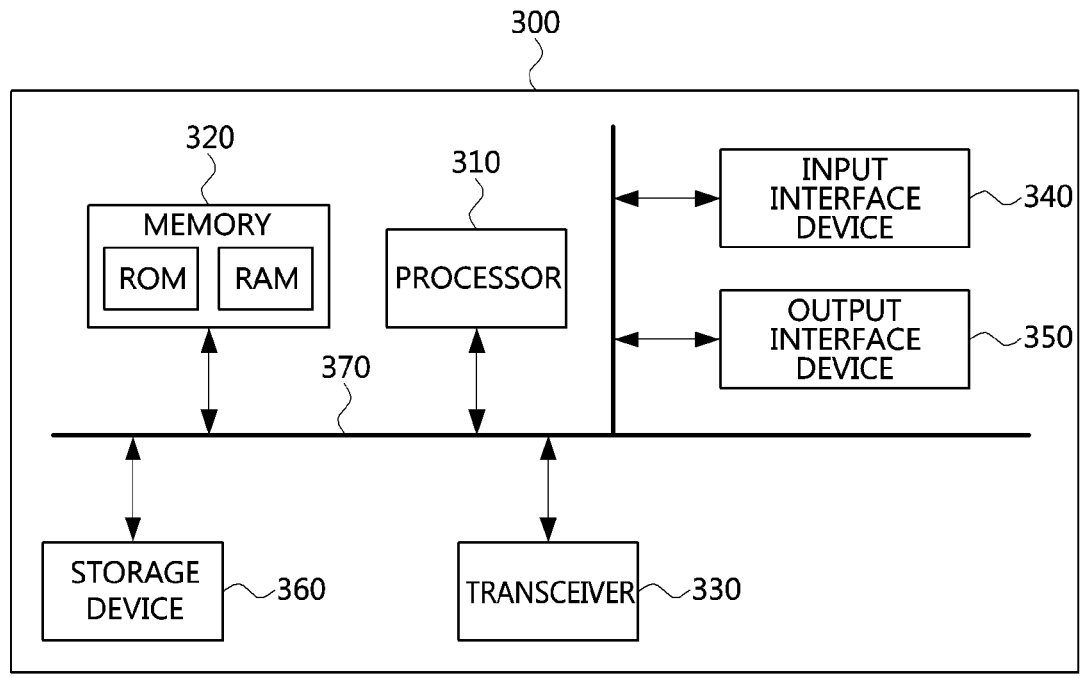
FIG. 3 is a conceptual diagram illustrating an exemplary embodiment of a communication node constituting a cellular communication system.

The communication nodes (e.g., base station, relay, UE, S-GW, P-GW, MME, UPF, SMF, AMF, etc.) comprising the cellular communication system may be configured as follows. FIG. 3 is a conceptual diagram illustrating an exemplary embodiment of a communication node constituting a cellular communication system.

As shown in FIG. 3, a communication node 300 may comprise at least one processor 310, a memory 320, and a transceiver 330 connected to a network for performing communications. Additionally, the communication node 300 may further comprise an input interface device 340, an output interface device 350, a storage device 360, and the like. Each component included in the communication node 300 may be configured to communicate with each other as connected via a bus 370.

However, each of the components included in the communication node 300 may be connected to the processor 310 via a separate interface or a separate bus rather than the common bus 370. For example, the processor 310 may be connected to at least one of the memory 320, the transceiver 330, the input interface device 340, the output interface device 350, and the storage device 360 via a dedicated interface.

The processor 310 may be configured to execute at least one instruction stored in at least one of the memory 320 and the storage device 360. The processor 310 may refer to a central processing unit (CPU), a graphics processing unit (GPU), or a dedicated processor on which methods in accordance with embodiments of the present disclosure are performed.

Each of the memory 320 and the storage device 360 may include at least one of a volatile storage medium and a non-volatile storage medium. For example, the memory 320 may comprise at least one of read-only memory (ROM) and random access memory (RAM).

Referring again to FIG. 2, in the communication system, the base station 210 may form a macro cell or a small cell, and may be connected to the core network via an ideal backhaul or a non-ideal backhaul. The base station 210 may be configured to transmit signals received from the core network to the UEs 231 through 236 and the relay 220, and may transmit signals received from the UEs 231 through 236 and the relay 220 to the core network. The UEs 231, 232, 234, 235 and 236 may belong to cell coverage of the base station 210. The UEs 231, 232, 234, 235 and 236 may be connected to the base station 210 by performing a connection establishment procedure with the base station 210. The UEs 231, 232, 234, 235 and 236 may communicate with the base station 210 after being connected to the base station 210.

The relay 220 may be connected to the base station 210 and may be configured to relay communications between the base station 210 and the UEs 233 and 234. In other words, the relay 220 may be configured to transmit signals received from the base station 210 to the UEs 233 and 234, and transmit signals received from the UEs 233 and 234 to the base station 210. The UE 234 may belong to both of the cell coverage of the base station 210 and the cell coverage of the relay 220, and the UE 233 may belong to the cell coverage of the relay 220. In other words, the UE 233 may be located outside the cell coverage of the base station 210. The UEs 233 and 234 may be connected to the relay 220 by performing a connection establishment procedure with the relay 220. The UEs 233 and 234 may be configured to communicate with the relay 220 after being connected to the relay 220.

The base station 210 and the relay 220 may support multiple-input, multiple-output (MIMO) technologies (e.g., single user (SU)-MIMO, multi-user (MU)-MIMO, massive MIMO, etc.), coordinated multipoint (CoMP) communication technologies, carrier aggregation (CA) communication technologies, unlicensed band communication technologies (e.g., Licensed Assisted Access (LAA), enhanced LAA (eLAA), etc.), sidelink communication technologies (e.g., ProSe communication technology, D2D communication technology), or the like. The UEs 231, 232, 235 and 236 may be configured to perform operations corresponding to the base station 210 and operations supported by the base station 210. The UEs 233 and 234 may perform operations corresponding to the relays 220 and operations supported by the relays 220.

In particular, the base station 210 may be referred to as a Node B (NB), an evolved Node B (eNB), a base transceiver station (BTS), a radio remote head (RRH), a transmission reception point (TRP), a radio unit (RU), a roadside unit (RSU), a radio transceiver, an access point, an access node, or the like. The relay 220 may be referred to as a small base station, a relay node, or the like. Each of the UEs 231 through 236 may be referred to as a terminal, an access terminal, a mobile terminal, a station, a subscriber station, a mobile station, a portable subscriber station, a node, a device, an on-broad unit (OBU), or the like.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

Meanwhile, the communications between the UEs 235 and 236 may be performed based on the sidelink communication technique. The sidelink communications may be performed based on a one-to-one scheme or a one-to-many scheme. When V2V communications are performed using the sidelink communication technique, the UE 235 may be the communication node located in the first vehicle 100 of FIG. 1 and the UE 236 may be the communication node located in the second vehicle 110 of FIG. 1. When V2I communications are performed using the sidelink communication technique, the UE 235 may be the communication node located in first vehicle 100 of FIG. 1 and the UE 236 may be the communication node located in the infrastructure 120 of FIG. 1. When V2P communications are performed using the sidelink communication technique, the UE 235 may be the communication node located in first vehicle 100 of FIG. 1 and the UE 236 may be the communication node carried by the person 130 of FIG. 1.

The scenarios to which the sidelink communications are applied may be classified as shown below in Table 1 according to the positions of the UEs (e.g., the UEs 235 and 236) participating in the sidelink communications. For example, the scenario for the sidelink communications between the UEs 235 and 236 shown in FIG. 2 may be a sidelink communication scenario C.

TABLE 1

| Sidelink Communication Scenario | Position of UE 235 | Position of UE 236 |
| --- | --- | --- |
| A | Out of coverage of base station 210 | Out of coverage of base station 210 |
| B | In coverage of base station 210 | Out of coverage of base station 210 |
| C | In coverage of base station 210 | In coverage of base station 210 |
| D | In coverage of base station 210 | In coverage of other base station |

Figure 4:
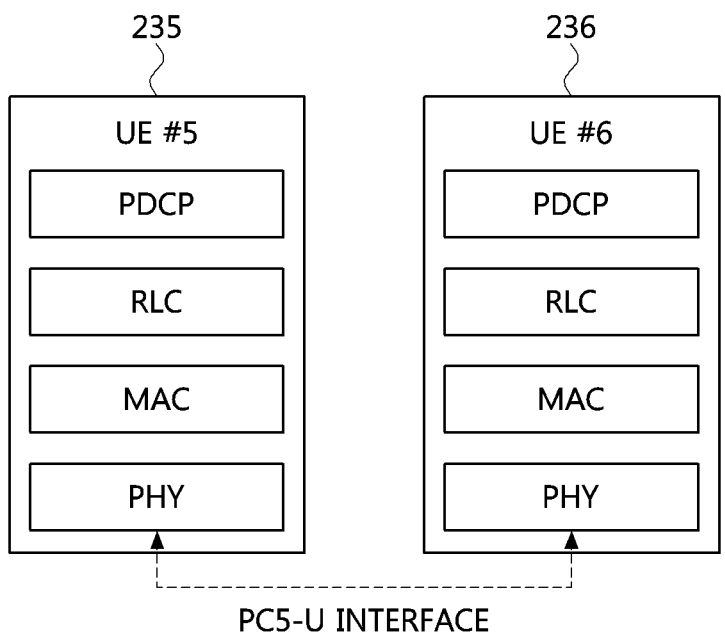
FIG. 4 is a block diagram illustrating an exemplary embodiment of a user plane protocol stack of a UE performing sidelink communication.

Meanwhile, a user plane protocol stack of the UEs (e.g., the UEs 235 and 236) performing sidelink communications may be configured as follows. FIG. 4 is a block diagram illustrating an exemplary embodiment of a user plane protocol stack of a UE performing sidelink communication.

As shown in FIG. 4, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The user plane protocol stack of each of the UEs 235 and 236 may comprise a physical (PHY) layer, a medium access control (MAC) layer, a radio link control (RLC) layer, and a packet data convergence protocol (PDCP) layer.

The sidelink communications between the UEs 235 and 236 may be performed using a PC5 interface (e.g., PC5-U interface). A layer-2 identifier (ID) (e.g., a source layer-2 ID, a destination layer-2 ID) may be used for the sidelink communications and the layer 2-ID may be an ID configured for the V2X communications (e.g., V2X service). Additionally, in the sidelink communications, a hybrid automatic repeat request (HARQ) feedback operation may be supported, and an RLC acknowledged mode (RLC AM) or an RLC unacknowledged mode (RLC UM) may be supported.

Figure 5:
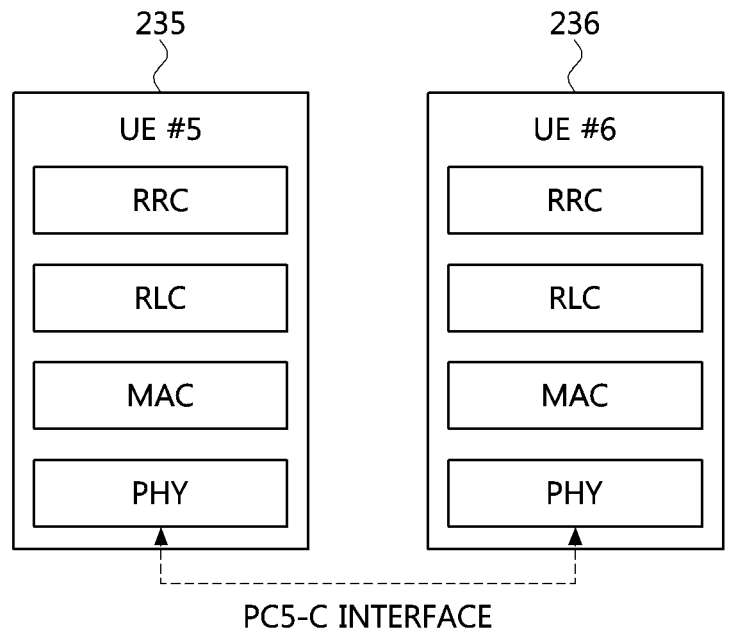
FIG. 5 is a block diagram illustrating a first exemplary embodiment of a control plane protocol stack of a UE performing sidelink communication.

Meanwhile, a control plane protocol stack of the UEs (e.g., the UEs 235 and 236) performing sidelink communications may be configured as follows. FIG. 5 is a block diagram illustrating a first exemplary embodiment of a control plane protocol stack of a UE performing sidelink communication, and FIG. 6 is a block diagram illustrating a second exemplary embodiment of a control plane protocol stack of a UE performing sidelink communication.

Figure 6:
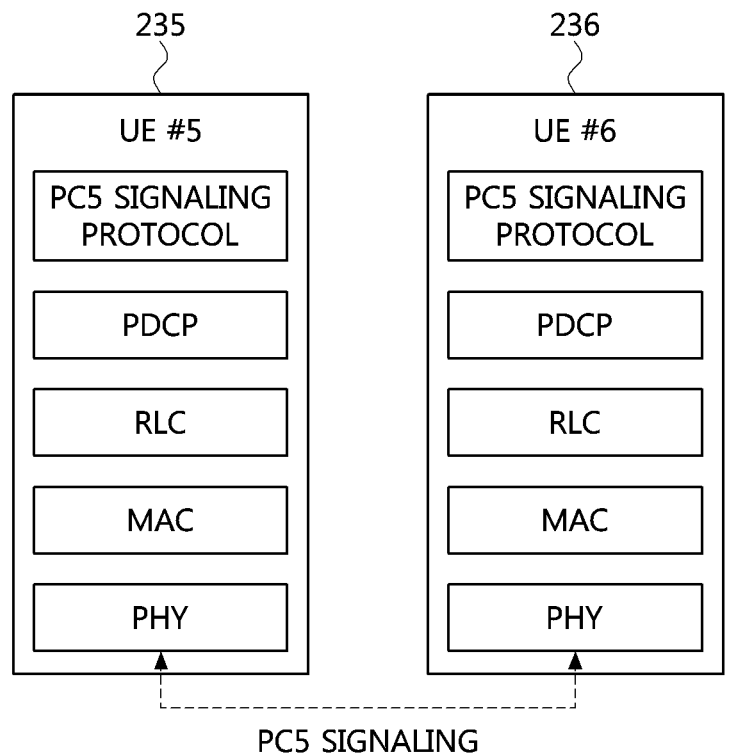
FIG. 6 is a block diagram illustrating a second exemplary embodiment of a control plane protocol stack of a UE performing sidelink communication.

As shown in FIGS. 5 and 6, a left UE may be the UE 235 shown in FIG. 2 and a right UE may be the UE 236 shown in FIG. 2. The scenario for the sidelink communications between the UEs 235 and 236 may be one of the sidelink communication scenarios A through D of Table 1. The control plane protocol stack illustrated in FIG. 5 may be a control plane protocol stack for transmission and reception of broadcast information (e.g., Physical Sidelink Broadcast Channel (PSBCH)).

The control plane protocol stack shown in FIG. 5 may include a PHY layer, a MAC layer, an RLC layer, and a radio resource control (RRC) layer. The sidelink communications between the UEs 235 and 236 may be performed using a PC5 interface (e.g., PC5-C interface). The control plane protocol stack shown in FIG. 6 may be a control plane protocol stack for one-to-one sidelink communication. The control plane protocol stack shown in FIG. 6 may include a PHY layer, a MAC layer, an RLC layer, a PDCP layer, and a PC5 signaling protocol layer.

Meanwhile, channels used in the sidelink communications between the UEs 235 and 236 may include a Physical Sidelink Shared Channel (PSSCH), a Physical Sidelink Control Channel (PSCCH), a Physical Sidelink Discovery Channel (PSDCH), and a Physical Sidelink Broadcast Channel (PSBCH). The PSSCH may be used for transmitting and receiving sidelink data and may be configured in the UE (e.g., UE 235 or 236) by a higher layer signaling. The PSCCH may be used for transmitting and receiving sidelink control information (SCI) and may also be configured in the UE (e.g., UE 235 or 236) by a higher layer signaling.

The PSDCH may be used for a discovery procedure. For example, a discovery signal may be transmitted over the PSDCH. The PSBCH may be used for transmitting and receiving broadcast information (e.g., system information). Additionally, a demodulation reference signal (DM-RS), a synchronization signal, or the like may be used in the sidelink communications between the UEs 235 and 236. The synchronization signal may include a primary sidelink synchronization signal (PSSS) and a secondary sidelink synchronization signal (SSSS).

Meanwhile, a sidelink transmission mode (TM) may be classified into sidelink TMs 1 to 4 as shown below in Table 2.

TABLE 2

| Sidelink TM | Description |
| --- | --- |
| 1 | Transmission using resources scheduled by base station |
| 2 | UE autonomous transmission without scheduling of base station |
| 3 | Transmission using resources scheduled by base station in V2X communications |
| 4 | UE autonomous transmission without scheduling of base station in V2X communications |

When the sidelink TM 3 or 4 is supported, each of the UEs 235 and 236 may be configured to perform sidelink communications using a resource pool configured by the base station 210. The resource pool may be configured for each of the sidelink control information and the sidelink data.

The resource pool for the sidelink control information may be configured based on an RRC signaling procedure (e.g., a dedicated RRC signaling procedure, a broadcast RRC signaling procedure). The resource pool used for reception of the sidelink control information may be configured by a broadcast RRC signaling procedure. When the sidelink TM 3 is supported, the resource pool used for transmission of the sidelink control information may be configured by a dedicated RRC signaling procedure. In particular, the sidelink control information may be transmitted through resources scheduled by the base station 210 within the resource pool configured by the dedicated RRC signaling procedure. When the sidelink TM 4 is supported, the resource pool used for transmission of the sidelink control information may be configured by a dedicated RRC signaling procedure or a broadcast RRC signaling procedure. Particularly, the sidelink control information may be transmitted through resources selected autonomously by the UE (e.g., UE 235 or 236) within the resource pool configured by the dedicated RRC signaling procedure or the broadcast RRC signaling procedure.

When the sidelink TM 3 is supported, the resource pool for transmitting and receiving sidelink data may not be configured. In particular, the sidelink data may be transmitted and received through resources scheduled by the base station 210. When the sidelink TM 4 is supported, the resource pool for transmitting and receiving sidelink data may be configured by a dedicated RRC signaling procedure or a broadcast RRC signaling procedure. In particular, the sidelink data may be transmitted and received through resources selected autonomously by the UE (e.g., UE 235 or 236) within the resource pool configured by the dedicated RRC signaling procedure or the broadcast RRC signaling procedure.

Hereinafter, methods for transmitting and receiving hybrid automatic repeat request (HARQ) responses for sidelink data (e.g., transport block (TB), code block group (CBG)) will be described. In the exemplary embodiments, an HARQ response may be referred to as 'HARQ-acknowledgement (HARQ-ACK)'. The HARQ response may be ACK or negative ACK (NACK). Even when a method (e.g., transmission or reception of a signal) to be performed at a first communication node among communication nodes is described, a corresponding second communication node may perform a method (e.g., reception or transmission of the signal) corresponding to the method performed at the first communication node. In other words, when an operation of a UE #1 (e.g., vehicle #1) is described, a UE #2 (e.g., vehicle #2) corresponding thereto may perform an operation corresponding to the operation of the UE #1. Conversely, when an operation of the UE #2 is described, the corresponding UE #1 may be configured to perform an operation corresponding to the operation of the UE #2. In exemplary embodiments described below, an operation of a vehicle may be an operation of a communication node located in the vehicle.

In exemplary embodiments, signaling may be one or a combination of two or more of higher layer signaling, MAC signaling, and physical (PHY) signaling. A message used for the higher layer signaling may be referred to as a 'higher layer message' or a 'higher layer signaling message'. A message used for the MAC signaling may be referred to as a 'MAC message' or a 'MAC signaling message'. A message used for the PHY signaling may be referred to as a 'PHY message' or a 'PHY signaling message'. The higher layer signaling may refer to an operation of transmitting and receiving system information (e.g., master information block (MIB), system information block (SIB)) and/or an RRC message. The MAC signaling may refer to an operation of transmitting and receiving a MAC control element (CE). The PHY signaling may refer to an operation of transmitting and receiving control information (e.g., downlink control information (DCI), uplink control information (UCI), SCI).

A sidelink signal may be a synchronization signal and a reference signal used for sidelink communication. For example, the synchronization signal may be a synchronization signal/physical broadcast channel (SS/PBCH) block, sidelink synchronization signal (SLSS), primary sidelink synchronization signal (PSSS), secondary sidelink synchronization signal (SSSS), or the like. The reference signal may be a channel state information-reference signal (CSI-RS), DM-RS, phase tracking-reference signal (PT-RS), cell specific reference signal (CRS), sounding reference signal (SRS), discovery reference signal (DRS), or the like.

A sidelink channel may be a PSSCH, PSCCH, PSDCH, PSBCH, physical sidelink feedback channel (PSFCH), or the like. In addition, a sidelink channel may refer to a sidelink channel including a sidelink signal mapped to specific resources in the corresponding sidelink channel. The sidelink communication may support a broadcast service, a multicast service, a groupcast service, and a unicast service.

The sidelink communication may be performed based on a single SCI scheme or a multi SCI scheme. When the single SCI scheme is used, data transmission (e.g., sidelink data transmission, sidelink-shared channel (SL-SCH) transmission) may be performed based on a single SCI (e.g., $1^{st}$-stage SCI). When the multi SCI scheme is used, data transmission may be performed using two SCIs (e.g., $1^{st}$-stage SCI and $2^{nd}$-stage SCI). The SCI may be transmitted through a PSCCH and/or a PSSCH. When the single SCI scheme is used, the SCI (e.g., $1^{st}$-stage SCI) may be transmitted through a PSCCH. When the multi SCI scheme is used, the $1^{st}$-stage SCI may be transmitted through a PSCCH, and the $2^{nd}$-stage SCI may be transmitted through a PSCCH or a PSSCH. The $1^{st}$-stage SCI may be referred to as a 'first stage SCI', and the $2^{nd}$-stage SCI may be referred to as a 'second stage SCI'.

The first stage SCI may include one or more information elements among priority information, frequency resource assignment information, time resource assignment information, resource reservation period information, DMRS pattern information, second stage SCI format information, beta_offset indicator, number of DMRS ports, and modulation and coding scheme (MCS) information. The second stage SCI may include one or more information elements among a HARQ process identifier (ID), redundancy version (RV), source ID, destination ID, CSI request information, zone ID, and communication range requirement.

Meanwhile, sidelink data (e.g., PSSCH) may be transmitted and received using one or more layers (e.g., a single layer or multiple layers). To support this operation, the SCI (e.g., $1^{st}$-stage SCI and/or $2^{nd}$-stage SCI) may include information indicating the number of layers and/or a transmission scheme. The number(s) of layers available in sidelink communication may be configured by higher layer signaling (e.g., MIB, SIB, RRC message) and/or MAC signaling, and the SCI may be used for indicating a specific number of layers from among the available number(s) of layers that may be used in sidelink communication. One or more layers may be supported in sidelink communication. The number of layers may mean the number of DMRS ports for the sidelink communication. For example, when n layer(s) are used in sidelink communication, it may indicate that n DMRS port(s) are used. The DMRS port may be a DMRS port for a PSSCH. In particular, n may be a natural number.

Sidelink communication (e.g., SCI and/or sidelink data transmission/reception operation) performed using two layers is described below, but the following exemplary embodiments may also be applied to sidelink communication using three or more layers. Transmission scheme(s) available in sidelink communication (e.g., supportable transmission scheme(s)) may be configured by higher layer signaling (e.g., MIB, SIB, RRC message) and/or MAC signaling. In addition, SCI may indicate a specific transmission scheme(s) among the available transmission scheme(s) configured by higher layer signaling and/or MAC signaling. The transmission scheme may be a combination of one or more among a space time coding (STC) scheme, a space frequency block coding (SFBC) scheme, a cyclic delay diversity (CDD) scheme, a diversity scheme, a multiplexing scheme, a rate matching scheme, a puncturing scheme, and a transport block size (TBS) scaling scheme. The SCI may include information indicating a combination of one or more among the above-described transmission schemes.

When sidelink communication is performed using two layers, information element(s) required to support this operation may be transmitted to the terminal(s) (e.g., transmitting terminal and/or receiving terminal). In exemplary embodiments, sidelink communication may refer to a transmission/reception operation of SCI (e.g., PSCCH) and/or a transmission/reception operation of sidelink data (e.g., PSSCH). In exemplary embodiments, the transmitting terminal may be a terminal that transmits SCI (e.g., a terminal that transmits sidelink data scheduled by the SCI), and the receiving terminal may be a terminal that receives the SCI (e.g., a terminal that receives sidelink data scheduled by the SCI).

In sidelink communication using one or more layers, transmission methods of an SCI (e.g., $2^{nd}$-stage SCI) and a PSSCH may be classified as follows.

[Transmission Method #1 of $2^{nd}$-Stage SCI and PSSCH]

In the transmission method #1, a $2^{nd}$-stage SCI may be transmitted through a single layer regardless of the number of layers for transmission of a PSSCH (e.g., sidelink data).

[Transmission Method #2 of $2^{nd}$-Stage SCI and PSSCH]

A $2^{nd}$-stage SCI may be transmitted through one or more layers (e.g., one layer or two layers). Here, a transmission scheme of the $2^{nd}$-stage SCI may be the same as a transmission scheme of the PSSCH.

[Transmission Method #3 of $2^{nd}$-Stage SCI and PSSCH]

A $2^{nd}$-stage SCI may be transmitted through one or more layers (e.g., one layer or two layers). Here, a transmission scheme of the $2^{nd}$-stage SCI may be independent from a transmission scheme of the PSSCH.

Figure 7:
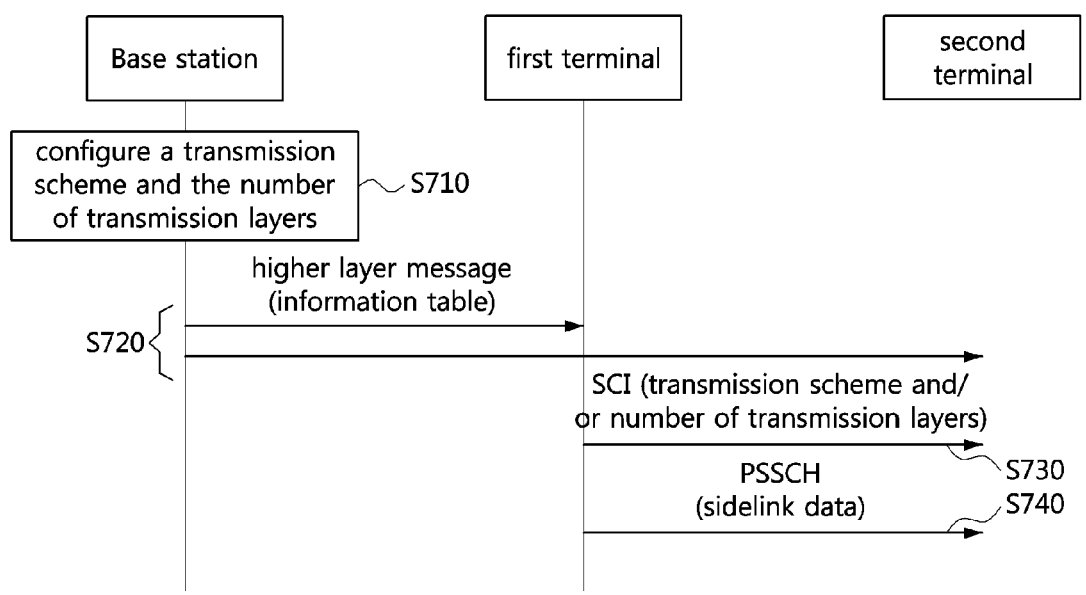
FIG. 7 is a sequence chart illustrating a first exemplary embodiment of a method of transmitting and receiving SCI and sidelink data in a communication system.

In the following, the transmission methods #1, #2, and #3 will be described in detail. FIG. 7 is a sequence chart illustrating a first exemplary embodiment of a method of transmitting and receiving SCI and sidelink data in a communication system.

As shown in FIG. 7, a communication system may include a base station, a first terminal, and a second terminal. The base station may be the base station 210 shown in FIG. 2, the first terminal may be the UE #5 235 shown in FIG. 2, and the second terminal may be the UE #6 236 shown in FIG. 2. Each of the base station, the first terminal, and the second terminal may be configured identically or similarly to the communication node 300 shown in FIG. 3. The first terminal and the second terminal may support the protocol stack(s) shown in FIGS. 4 to 6. The first terminal may be a transmitting terminal, and the second terminal may be a receiving terminal.

[Transmission Method #1 of $2^{nd}$-Stage SCI and PSSCH]

In the transmission method #1, a $2^{nd}$-stage SCI may be transmitted through a single layer regardless of the number of layers for transmission of a PSSCH. The information element(s) required for PSSCH transmission using one or more layers may be transmitted through a $1^{st}$-stage SCI and/or a $2^{nd}$-stage SCI. The transmission method #1 may be classified into a transmission method #1-1, a transmission method #1-2, a transmission method #1-3, and a transmission method #1-4 according to a signaling scheme of the information element(s).

Transmission Method #1-1

The base station may configure transmission scheme(s) for sidelink communication (S710). For example, the base station may configure a transmission scheme table (e.g., transmission scheme list) as shown in Table 3 below. The transmission scheme indicated by the transmission scheme table may be a transmission scheme of a $2^{nd}$-stage SCI and/or a PSSCH. Here, transmission of the $2^{nd}$-stage SCI and/or PSSCH may be performed through one or more layers (e.g., one layer or two layers).

TABLE 3

| Indication bits | Transmission scheme |
|---|---|
| 00 | Transmission scheme #1 |
| 01 | Transmission scheme #2 |
| 10 | Transmission scheme #3 |
| 11 | Reserved |

The base station may be configured to transmit information of the transmission scheme table to the terminal(s) (e.g., the first terminal and/or the second terminal) through higher layer signaling (S720). Alternatively, the information of the transmission scheme table may be transmitted through one or a combination of two or more among higher layer signaling, MAC signaling, and PHY signaling. In exemplary embodiments, the 'terminal(s)' may be the first terminal and/or the second terminal.

The terminal(s) may be configured to receive the information of the transmission scheme table from the base station, and identify the transmission scheme(s) indicated by the corresponding information (e.g., transmission scheme(s) defined in Table 3). The first terminal, which is a transmitting terminal, may be configured to select one transmission scheme from the transmission scheme table configured by the base station. The first terminal may be configured to transmit SCI including indication bits indicating the transmission scheme to the second terminal (S730). When the transmission scheme #1 is selected from the transmission scheme table, the indication bits may be '00'. When the transmission scheme #2 is selected from the transmission scheme table, the indication bits may be '01'. The indication bits indicating the transmission scheme may be included in the $1^{st}$-stage SCI and/or the $2^{nd}$-stage SCI. The SCI transmitted in the step S730 (e.g., $1^{st}$-stage SCI and/or $2^{nd}$-stage SCI) may further include scheduling information of a PSSCH.

The second terminal, which is a receiving terminal, may be configured to receive the SCI from the first terminal, and identify the information elements (e.g., indication bits, scheduling information, etc.) included in the SCI. Since the transmission scheme table is configured for PSSCH transmission using multiple layers (e.g., two layers), if the indication bits indicating one transmission scheme in the transmission scheme table are received, the second terminal may be configured to determine that PSSCH transmission scheduled by the SCI is to be performed through multiple layers (e.g., two layers). In addition, the second terminal may be configured to determine that the transmission of the $2^{nd}$-stage SCI is to be performed through multiple layers (e.g., two layers).

After the step S730, the first terminal may be configured to transmit the PSSCH (e.g., sidelink data) to the second terminal based on the information elements included in the SCI (S740). For example, the first terminal may be configured to transmit the PSSCH to the second terminal using the transmission scheme indicated by the indication bits included in the SCI. The second terminal may be configured to perform a PSSCH reception operation based on the information elements included in the SCI. For example, the second terminal may receive the PSSCH based on the transmission scheme indicated by the indication bits included in the SCI. In particular, the PSSCH may be transmitted and received through multiple layers (e.g., two layers).

Transmission Method #1-2

The base station may configure transmission scheme(s) for sidelink communication (S710). For example, the base station may configure a transmission scheme table as shown in Table 4 below. The transmission scheme indicated by the transmission scheme table may be a transmission scheme of a $2^{nd}$-stage SCI and/or a PSSCH. Here, transmission of the $2^{nd}$-stage SCI and/or PSSCH may be performed through one or more layers (e.g., two layers).

TABLE 4

| Indication bits | Transmission scheme |
|---|---|
| 00 | Transmission scheme #1 (one layer) |
| 01 | Transmission scheme #1 (two layers) |
| 10 | Transmission scheme #2 |
| 11 | Transmission scheme #3 |

When the transmission scheme #1 is used, the PSSCH transmission may be performed through one layer or two layers. The indication bits set to '00' in Table 4 may indicate the transmission scheme #1 using one layer. The indication bits set to '01' in Table 4 may indicate the transmission scheme #1 using two layers. When the transmission scheme #2 or the transmission scheme #3 is used, the PSSCH transmission may be performed through two layers. In other words, the transmission scheme #2 and the transmission scheme #3 may not support the PSSCH transmission using one layer.

The base station may be configured to transmit information of the transmission scheme table to the terminal(s) (e.g., the first terminal and/or the second terminal) through higher layer signaling (S720). Alternatively, the information of the transmission scheme table may be transmitted through one or a combination of two or more among higher layer signaling, MAC signaling, and PHY signaling.

The terminal(s) may be configured to receive the information of the transmission scheme table from the base station, and identify the transmission scheme(s) indicated by the corresponding information (e.g., the transmission scheme(s) defined in Table 4). The first terminal may be configured to select one transmission scheme from the transmission scheme table configured by the base station. The first terminal may transmit SCI including indication bits indicating the transmission scheme to the second terminal (S730). When the transmission scheme #1 using two layers is selected from the transmission scheme table, the indication bits may be '01'. When the transmission scheme #2 is selected from the transmission scheme table, the indication bits may be '10'. The indication bits indicating the transmission scheme may be included in the $1^{st}$-stage SCI and/or the $2^{nd}$-stage SCI. The SCI transmitted in the step S730 (e.g., $1^{st}$-stage SCI and/or $2^{nd}$-stage SCI) may further include scheduling information of a PSSCH.

The second terminal may be configured to receive the SCI from the first terminal, and identify the information elements (e.g., indication bits, scheduling information, etc.) included in the SCI. For example, the second terminal may be configured to identify the number (e.g., 1 or 2) of layers through which the PSSCH is to be transmitted based on the indication bits included in the SCI. After the step S730, the first terminal may be configured to transmit the PSSCH (e.g., sidelink data) to the second terminal based on the information elements included in the SCI (S740). For example, the first terminal may be configured to transmit the PSSCH to the second terminal using the transmission scheme indicated by the indication bits included in the SCI. The second terminal may be configured to perform a PSSCH reception operation based on the information elements included in the SCI. For example, the second terminal may be configured to receive the PSSCH based on the transmission scheme indicated by the indication bits included in the SCI. In particular, the PSSCH may be transmitted and received through one or more layers (e.g., one layer or two layers).

Transmission Method #1-3

The base station may configure transmission scheme(s) and the number of layer(s) for sidelink communication (S710). For example, the base station may configure a transmission scheme table as shown in Table 3, and may configure a layer table as shown in Table 5 below. The transmission scheme table may be configured independently of the layer table. The transmission scheme indicated by the transmission scheme table may be a transmission scheme of a $2^{nd}$-stage SCI and/or a PSSCH. The number of layers supported by the transmission scheme indicated by the transmission scheme table may be indicated by the layer table. In other words, the transmission scheme(s) and the number of layers(s) for the $2^{nd}$-stage SCI and/or PSSCH may be indicated by a combination of the transmission scheme table and the layer table.

TABLE 5

| Indication bits | Number of layers |
|---|---|
| 0 | 1 |
| 1 | 2 |

The base station may be configured to transmit information of the transmission scheme table and information of the layer table to the terminal(s) (e.g., the first terminal and/or the second terminal) through higher layer signaling (S720). Alternatively, the information of the transmission scheme table and the information of the layer table may be transmitted through one or a combination of two or more among higher layer signaling, MAC signaling, and PHY signaling.

The terminal(s) may be configured to receive the information of the transmission scheme table and the information of the layer table from the base station, and identify the transmission schemes(s) (e.g., the transmission scheme(s) defined in Table 3) and the number of layer(s) (e.g., the number of layers defined in Table 5) indicated by the corresponding information. The first terminal may be configured to select a transmission scheme from the transmission scheme table configured by the base station, and select the number of layers from the layer table configured by the base station.

The first terminal may be configured to transmit SCI including first indication bits indicating the transmission scheme and second indication bits indicating the number of layers to the second terminal (S730). The SCI transmitted in the step S730 may further include scheduling information of a PSSCH. Both the first indication bits and the second indication bits may be included in the $1^{st}$-stage SCI. Alternatively, both the first indication bits and the second indication bits may be included in the $2^{nd}$-stage SCI. Alternatively, the first indication bits may be included in the $1^{st}$-stage SCI, and the second indication bits may be included in the $2^{nd}$-stage SCI. Alternatively, the second indication bits may be included in the $1^{st}$-stage SCI, and the first indication bits may be included in the $2^{nd}$-stage SCI.

The second terminal may be configured to receive the SCI from the first terminal, and identify the information elements (e.g., first indication bits, second indication bits, scheduling information, etc.) included in the SCI. For example, the second terminal may be configured to identify the transmission scheme of the PSSCH based on the first indication bits included in the SCI, and identify the number (e.g., 1 or 2) of layers through which the PSSCH is to be transmitted based on the second indication bits included in the SCI. After the step S730, the first terminal may be configured to transmit the PSSCH (e.g., sidelink data) to the second terminal based on the information elements included in the SCI (S740).

For example, the first terminal may be configured to transmit the PSSCH to the second terminal through the layer(s) indicated by the second indication bits using the transmission scheme indicated by the first indication bits. The second terminal may be configured to perform a PSSCH reception operation based on the information elements included in the SCI. For example, the second terminal may be configured to receive the PSSCH through the layer(s) indicated by the second indication bits based on the transmission scheme indicated by the first indication bits. In particular, the PSSCH may be transmitted and received through one or more layers (e.g., one layer or two layers).
Transmission Method #1-4

The base station may configure the number of layer(s) for sidelink communication (S710). For example, the base station may configure a layer table as shown in Table 5. The layer table may indicate the number of layer(s) through which PSSCH transmission is to be performed. In particular, the number of layers may indicates the number of DMRS ports for a PSSCH. For example, an indication bit set to a first value (e.g., 0) may indicate one layer or one DMRS port (e.g., antenna port 1000), and the indication bit set to a second value (e.g., 1) may indicate two layers or two DMRS ports (e.g., antenna ports 1000 and 1001).

The base station may be configured to transmit information of the layer table to the terminal(s) (e.g., the first terminal and/or the second terminal) through higher layer signaling (S720). Alternatively, the information of the layer table may be transmitted through one or a combination of two or more among higher layer signaling, MAC signaling, and PHY signaling.

The terminal(s) may be configured to receive the information of the layer table from the base station, and identify the number(s) of layers indicated by the corresponding information (e.g., the number of layer(s) defined in Table 5). The first terminal may be configured to select the number of layers from the layer table configured by the base station. Alternatively, the layer table may be predefined in the technical specification without configuration of the base station, and the first terminal may be configured to select the number of layers from the predefined layer table.

The first terminal may be configured to transmit SCI including indication bits indicating the number of layers to the second terminal (S730). The indication bits indicating the number of layers may be included in a $1^{st}$-state SCI and/or a $2^{nd}$-stage SCI. When the indication bits indicating the number of layers is included in the $1^{st}$-stage SCI, transmission of the $2^{nd}$-stage SCI may be omitted in the step S730. In other words, a single SCI may be transmitted. The SCI transmitted in the step S730 (e.g., the $1^{st}$-stage SCI and/or the $2^{nd}$-stage SCI) may further include scheduling information of a PSSCH.

The second terminal may be configured to receive the SCI from the first terminal and identify the information elements (e.g., indication bits, scheduling information, etc.) included in the SCI. For example, the second terminal may be configured to identify the number of layers (or the number of DMRS ports) through which the PSSCH is to be transmitted based on the indication bits included in the $1^{st}$-stage SCI. The indication bit set to a first value (e.g., 0) may indicate that the PSSCH is to be transmitted through one layer or that one DMRS port (e.g., antenna port 1000) is used for the PSSCH transmission. The indication bit set to a second value (e.g., 1) may indicate that the PSSCH is to be transmitted through two layers or that two DMRS ports (e.g., antenna ports 1000 and 1001) are used for the PSSCH transmission.

After the step S730, the first terminal may be configured to transmit the PSSCH (e.g., sidelink data) to the second terminal based on the information elements included in the SCI (S740). For example, the first terminal may be configured to transmit the PSSCH to the second terminal through the layer(s) indicated by the indication bits included in the SCI. In particular, a PSSCH DMRS may be transmitted through the antenna port(s) indicated by the indication bits included in the SCI. The second terminal may be configured to perform a PSSCH reception operation based on the information elements included in the SCI. For example, the second terminal may be configured to detect the PSSCH DMRS based on the DMRS port(s) indicated by the indication bits included in the SCI, and perform a reception operation for the PSSCH based on the detected PSSCH DMRS. The PSSCH may be received through the layer(s) indicated by the indication bits included in the SCI.

Meanwhile, in the transmission scheme table defined in Table 3, the transmission scheme #1 may support transmission through one layer and transmission through two layers, and each of the transmission scheme #2 and transmission scheme #3 may support only transmission through two layers. In particular, if the indication bits indicate the transmission scheme #2 or the transmission scheme #3, additional signaling for indicating the number of layers may not be required. The second terminal (e.g., receiving terminal) receiving the indication bits indicating the transmission scheme #2 or transmission scheme #3 may know that transmission is to be performed through two layers. In particular, the indication bits indicating the number of layers in the SCI may be used for other purposes. When PSSCH transmission is performed based on one transmission scheme, the indication bits defined in Table 3 may not be used. The $1^{st}$-stage SCI and/or the $2^{nd}$-stage SCI may include the indication bit indicating the number of layers (or the number of DMRS ports) defined in Table 5.

[Transmission Method #2 of $2^{nd}$-Stage SCI and PSSCH]

In the transmission method #2, a $2^{nd}$-stage SCI may be transmitted through one or more layers (e.g., one layer or two layers). Here, a transmission scheme of the $2^{nd}$-stage SCI may be the same as a transmission scheme of the PSSCH. The information element(s) required for the transmission of the $2^{nd}$-stage SCI and PSSCH using one or more layers may be transmitted through the $1^{st}$-stage SCI. The transmission method #2 may be classified into a transmission method #2-1, a transmission method #2-2, a transmission method #2-3, and a transmission method #2-4 according to a signaling scheme of the information element(s).
Transmission Method #2-4

The base station may configure transmission scheme(s) for sidelink communication (S710). For example, the base station may configure a transmission scheme table as shown in Table 3. The transmission scheme indicated by the transmission scheme table may be a transmission scheme of a $2^{nd}$-stage SCI and a PSSCH. Here, transmission of the $2^{nd}$-stage SCI and PSSCH may be performed through multiple layers (e.g., two layers). The base station may be configured to transmit information of the transmission scheme table to the terminal(s) (e.g., the first terminal and/or the second terminal) through higher layer signaling (S720). Alternatively, the information of the transmission scheme table may be transmitted through one or a combination of two or more among higher layer signaling, MAC signaling, and PHY signaling.

The terminal(s) may be configured to receive the information of the transmission scheme table from the base station, and identify the transmission scheme(s) indicated by the corresponding information (e.g., transmission scheme(s) defined in Table 3). The first terminal may be configured to select one transmission scheme from the transmission scheme table configured by the base station. The first terminal may transmit a $1^{st}$-stage SCI including indication bits indicating the transmission scheme to the second terminal (S730). In addition, in the step S730, the first terminal may be configured to transmit a $2^{nd}$-stage SCI based on the transmission scheme indicated by the indication bits included in the $1^{st}$-stage SCI. When the transmission scheme #1 is selected from the transmission scheme table, the indication bits may be '00'. Additionally, when the transmission scheme #2 is selected from the transmission scheme table, the indication bits may be '01'. The SCI transmitted in the step S730 may further include scheduling information of a PSSCH.

The second terminal may be configured to receive the $1^{st}$-stage SCI from the first terminal, and identify the information elements (e.g., indication bits, scheduling information, etc.) included in the $1^{st}$-stage SCI. Since the transmission scheme table is configured for transmission of the $2^{nd}$-stage SCI and PSSCH using multiple layers (e.g., two layers), if the indication bits indicating one transmission scheme in the transmission scheme table is received, the second terminal may be configured to determine that the transmission of the $2^{nd}$-stage SCI and PSSCH is to be performed through multiple layers (e.g., two layers). After receiving the $1^{st}$-stage SCI, the second terminal may be configured to receive the $2^{nd}$-stage SCI based on the transmission scheme indicated by the indication bits included in the $1^{st}$-stage SCI.

After the step S730, the first terminal may be configured to transmit the PSSCH (e.g., sidelink data) to the second terminal based on the information elements included in the SCI (S740). For example, the first terminal may be configured to transmit the PSSCH to the second terminal using the transmission scheme indicated by the indication bits included in the $1^{st}$-stage SCI. The second terminal may be configured to perform a PSSCH reception operation based on the information elements included in the SCI. For example, the second terminal may be configured to receive the PSSCH based on the transmission scheme indicated by the indication bits included in the $1^{st}$-stage SCI. In particular, the PSSCH may be transmitted and received through multiple layers (e.g., two layers).

Transmission Method #2-2

The base station may configure transmission scheme(s) for sidelink communication (S710). For example, the base station may configure a transmission scheme table as shown in Table 4. The transmission scheme indicated by the transmission scheme table may be a transmission scheme of a $2^{nd}$-stage SCI and a PSSCH. Here, transmission of the $2^{nd}$-stage SCI and PSSCH may be performed through one or more layers (e.g., two layers).

When the transmission scheme #1 is used, the transmission of the $2^{nd}$-stage SCI and PSSCH may be performed through one layer or two layers. The indication bits set to '00' in Table 4 may indicate the transmission scheme #1 using one layer. The indication bits set to '01' in Table 4 may indicate the transmission scheme #1 using two layers. When the transmission scheme #2 or the transmission scheme #3 is used, the transmission of the $2^{nd}$-stage SCI and PSSCH may be performed through two layers. In other words, the transmission scheme #2 and the transmission scheme #3 may not support transmission of the $2^{nd}$-stage SCI and PSSCH using one layer. The base station may be configured to transmit information of the transmission scheme table to the terminal(s) (e.g., the first terminal and/or the second terminal) through higher layer signaling (S720). Alternatively, the information of the transmission scheme table may be transmitted through one or a combination of two or more among higher layer signaling, MAC signaling, and PHY signaling.

The terminal(s) may be configured to receive the information of the transmission scheme table from the base station, and identify the transmission scheme(s) indicated by the corresponding information (e.g., transmission scheme(s) defined in Table 4). The first terminal may be configured to select one transmission scheme from the transmission scheme table configured by the base station. The first terminal may be configured to transmit a $1^{st}$-stage SCI including indication bits indicating the transmission scheme to the second terminal (S730). In addition, in the step S730, the first terminal may be configured to transmit a $2^{nd}$-stage SCI based on the transmission scheme indicated by the indication bits included in the $1^{st}$-stage SCI. When the transmission scheme #1 using two layers is selected from the transmission scheme table, the indication bits may be '01'. Additionally, when the transmission scheme #2 is selected from the transmission scheme table, the indication bits may be '10'. The SCI transmitted in the step S730 may further include scheduling information of a PSSCH.

The second terminal may be configured to receive the $1^{st}$-stage SCI from the first terminal, and identify the information elements (e.g., indication bits, scheduling information, etc.) included in the SCI. For example, the second terminal may be configured to identify the number (e.g., 1 or 2) of layers through which the $2^{nd}$-stage SCI and the PSCCH are to be transmitted based on the indication bits included in the $1^{st}$-stage SCI. After receiving the $1^{st}$-stage SCI, the second terminal may be configured to receive the $2^{nd}$-stage SCI based on the transmission scheme indicated by the indication bits included in the $1^{st}$-stage SCI.

After the step S730, the first terminal may be configured to transmit the PSSCH (e.g., sidelink data) to the second terminal based on the information elements included in the SCI (S740). For example, the first terminal may be configured to transmit the PSSCH to the second terminal using the transmission scheme indicated by the indication bits included in the $1^{st}$-stage SCI. The second terminal may be configured to perform a PSSCH reception operation based on the information elements included in the SCI. For example, the second terminal may be configured to receive the PSSCH based on the transmission scheme indicated by the indication bits included in the $1^{st}$-stage SCI. In particular, the PSSCH may be transmitted and received through one or more layers (e.g., one layer or two layers).

Transmission Method #2-3

The base station may configure transmission scheme(s) and the number of layer(s) for sidelink communication (S710). For example, the base station may configure a transmission scheme table as shown in Table 3, and may configure a layer table as shown in Table 5 below. The transmission scheme table may be configured independently of the layer table. The transmission scheme indicated by the transmission scheme table may be a transmission scheme of a $2^{nd}$-stage SCI and a PSSCH. The number of layers supported by the transmission scheme indicated by the transmission scheme table may be indicated by the layer table. In other words, the transmission scheme(s) and the number of layers(s) for each of the $2^{nd}$-stage SCI and the PSSCH may be indicated by a combination of the transmission scheme table and the layer table.

The base station may be configured to transmit information of the transmission scheme table and information of the layer table to the terminal(s) (e.g., the first terminal and/or the second terminal) through higher layer signaling (S720). Alternatively, the information of the transmission scheme table and the information of the layer table may be transmitted through one or a combination of two or more among higher layer signaling, MAC signaling, and PHY signaling.

The terminal(s) may be configured to receive the information of the transmission scheme table and the information of the layer table from the base station, and identify the transmission schemes(s) (e.g., the transmission scheme(s) defined in Table 3) and the number of layer(s) (e.g., the number of layers defined in Table 5) indicated by the corresponding information. The first terminal may be configured to select a transmission scheme from the transmission scheme table configured by the base station, and select the number of layers from the layer table configured by the base station.

The first terminal may be configured to transmit a $1^{st}$-stage SCI including first indication bits indicating the transmission scheme and second indication bits indicating the number of layers to the second terminal (S730). In addition, in the step S730, the first terminal may use the transmission scheme indicated by the first indication bits included in the $1^{st}$-stage SCI and the layer(s) indicated by the second indication bits included in the $1^{st}$-stage SCI to transmit a $2^{nd}$-stage SCI to the second terminal. The SCI transmitted in the step S730 may further include scheduling information of a PSSCH.

The second terminal may be configured to receive the $1^{st}$-stage SCI from the first terminal, and identify the information elements (e.g., first indication bits, second indication bits, scheduling information, etc.) included in the $1^{st}$-stage SCI. For example, the second terminal may be configured to identify the transmission scheme of the $2^{nd}$-stage SCI and/or the PSSCH based on the first indication bits included in the $1^{st}$-stage SCI, and may identify the number (e.g., 1 or 2) of layers through which the $2^{nd}$-stage SCI and/or PSSCH is to be transmitted based on the second indication bits included in the $1^{st}$-stage SCI. The second terminal may be configured to receive the $2^{nd}$-stage SCI by using the transmission scheme indicated by the first indication bits included in the $1^{st}$-stage SCI and the layer(s) indicated by the second indication bits included in the $1^{st}$-stage SCI.

After the step S730, the first terminal may be configured to transmit the PSSCH (e.g., sidelink data) to the second terminal based on the information elements included in the SCI (S740). For example, the first terminal may be configured to transmit the PSSCH to the second terminal using the transmission scheme indicated by the first indication bits included in the $1^{st}$-stage SCI and the layer(s) indicated by the second indication bits included in the $1^{st}$-stage SCI. The second terminal may be configured to perform a PSSCH reception operation based on the information elements included in the SCI. For example, the second terminal may be configured to receive the PSSCH by using the transmission scheme indicated by the first indication bits included in the $1^{st}$-stage SCI and the layer(s) indicated by the second indication bits included in the $1^{st}$-stage SCI. In particular, the PSSCH may be transmitted and received through one or more layers (e.g., one layer or two layers).

Transmission Method #2-4

The base station may configure the number of layer(s) for sidelink communication (S710). For example, the base station may configure a layer table as shown in Table 5. The layer table may indicate the number of layer(s) through which transmission of a $2^{nd}$-stage SCI and a PSSCH is to be performed. Here, the number of layers may mean the number of DMRS ports for the PSCCH and the number of DMRS ports for the PSSCH. For example, an indication bit set to a first value (e.g., 0) may indicate one layer or one DMRS port (e.g., antenna port 1000), and the indication bit set to a second value (e.g., 1) may indicate two layers or two DMRS ports (e.g., antenna ports 1000 and 1001).

The base station may be configured to transmit information of the layer table to the terminal(s) (e.g., the first terminal and/or the second terminal) through higher layer signaling (S720). Alternatively, the information of the layer table may be transmitted through one or a combination of two or more among higher layer signaling, MAC signaling, and PHY signaling.

The terminal(s) may be configured to receive the information of the layer table from the base station, and identify the number(s) of layers indicated by the corresponding information (e.g., the number of layers(s) defined in Table 5). The first terminal may be configured to select the number of layers (or, the number of DMRS ports) from the layer table configured by the base station. Alternatively, the layer table may be predefined in the technical specification without configuration of the base station, and the first terminal may select the number of layers from the predefined layer table.

The first terminal may be configured to transmit a $1^{st}$-stage SCI including an indication bit indicating the number of layers to the second terminal (S730). In addition, in the step S730, the first terminal may be configured to transmit a $2^{nd}$-stage SCI through the layer(s) indicated by the indication bit included in the $1^{st}$-stage SCI. The SCI transmitted in the step S730 may further include scheduling information of a PSSCH.

The second terminal may be configured to receive the $1^{st}$-stage SCI from the first terminal and may identify the information elements (e.g., indication bits, scheduling information, etc.) included in the SCI. For example, the second terminal may be configured to identify the number of layers (or the number of DMRS ports) through which the PSSCH is to be transmitted based on the indication bits included in the $1^{st}$-stage SCI. The indication bit set to a first value (e.g., 0) may indicate that the $2^{nd}$-stage SCI and the PSSCH are to be transmitted through one layer or that one DMRS port (e.g., antenna port 1000) is used for the transmission of the $2^{nd}$-stage SCI and the PSSCH. The indication bit set to a second value (e.g., 1) may indicate that the $2^{nd}$-stage SCI and the PSSCH are to be transmitted through two layers or that two DMRS ports (e.g., antenna ports 1000 and 1001) are used for the transmission of the $2^{nd}$-stage SCI and the PSSCH. The second terminal may be configured to receive the $2^{nd}$-stage SCI through the layer(s) indicated by the indication bit included in the 1-stage SCI.

After the step S730, the first terminal may be configured to transmit the PSSCH (e.g., sidelink data) to the second terminal based on the information elements included in the SCI (S740). For example, the first terminal may be configured to transmit the PSSCH to the second terminal through the layer(s) indicated by the indication bit included in the $1^{st}$-stage SCI. In particular, a PSSCH DMRS may be transmitted through the antenna port(s) indicated by the indication bit included in the $1^{st}$-stage SCI. The second terminal may be configured to perform a PSSCH reception operation based on the information elements included in the SCI. For example, the second terminal may be configured to detect the PSSCH DMRS based on the DMRS port(s) indicated by the indication bit included in the $1^{st}$-stage SCI, and perform a reception operation for a PSSCH based on the detected PSSCH DMRS. The PSSCH may be received through the layer(s) indicated by the indication bit included in the $1^{st}$-stage SCI.

Meanwhile, in the transmission scheme table defined in Table 3, the transmission scheme #1 may support transmission through one layer and transmission through two layers, and each of the transmission scheme #2 and transmission scheme #3 may support only transmission through two layers. In particular, if the indication bits indicate the transmission scheme #2 or the transmission scheme #3, additional signaling for indicating the number of layers may not be required. The second terminal (e.g., receiving terminal) receiving the indication bits indicating the transmission scheme #2 or transmission scheme #3 may know that transmission is to be performed through two layers. In particular, the indication bit indicating the number of layers in the $1^{st}$-stage SCI may be used for other purposes. When the transmission of the $2^{nd}$-stage SCI and the PSSCH is performed based on one transmission scheme, the indication bits defined in Table 3 may not be used. Additionally, the $1^{st}$-stage SCI may include the indication bit indicating the number of layers (or the number of DMRS ports) defined in Table 5.

[Transmission Method #3 of $2^{nd}$-Stage SCI and PSSCH]

In the transmission method #3, a $2^{nd}$-stage SCI may be transmitted through one or more layers (e.g., one layer or two layers). Here, a transmission scheme of the $2^{nd}$-stage SCI may be configured independently of a transmission method of the PSSCH. The information element(s) required for the transmission of the $2^{nd}$-stage SCI using one or more layers may be transmitted through the $1^{st}$-stage SCI, and the information element(s) required for the transmission of the PSSCH using one or more layers may be transmitted through the $2^{nd}$-stage SCI. Alternatively, the information element(s) required for the transmission of the $2^{nd}$-stage SCI and the PSSCH using one or more layers may be transmitted through the $1^{st}$-stage SCI. The transmission method #3 may be classified into a transmission method #3-1, a transmission method #3-2, a transmission method #3-3, and a transmission method #3-4 according to a signaling scheme of the information element(s).

Transmission #3-1

The base station may configure the transmission scheme(s) for the $2^{nd}$-stage SCI and transmission scheme(s) for the PSSCH (S710). For example, the base station may configure a first transmission scheme table for the $2^{nd}$-stage SCI as shown in Table 6. The transmission scheme indicated by the transmission scheme table may be a transmission scheme of the $2^{nd}$-stage SCI. Here, transmission of the $2^{nd}$-stage SCI may be performed through multiple layers (e.g., two layers).

TABLE 6

| Indication bits | Transmission scheme of $2^{nd}$-stage SCI |
|---|---|
| 00 | Transmission scheme #1 |
| 01 | Transmission scheme #2 |
| 10 | Transmission scheme #3 |
| 11 | Reserved |

In addition, the base station may configure a second transmission scheme table for the PSSCH as shown in Table 7 below or Table 8 below. The transmission scheme indicated by the second transmission scheme table may be a transmission scheme of the PSSCH. Here, transmission of the PSSCH may be performed through multiple layers (e.g., two layers). When Table 7 is used, the type of transmission scheme supported for the PSSCH may be the same as the type of transmission scheme supported for the $2^{nd}$-stage SCI. When Table 8 is used, the type of transmission scheme supported for the PSSCH may be different from the type of transmission scheme supported for the $2^{nd}$-stage SC.

TABLE 7

| Indication bits | Transmission scheme of PSSCH |
|---|---|
| 00 | Transmission scheme #1 |
| 01 | Transmission scheme #2 |
| 10 | Transmission scheme #3 |
| 11 | Reserved |

TABLE 8

| Indication bits | Transmission scheme of PSSCH |
|---|---|
| 00 | Transmission scheme #1 |
| 01 | Transmission scheme #2 |
| 10 | Transmission scheme #4 |
| 11 | Transmission scheme #5 |

The base station may be configured to transmit information of the first transmission scheme table and information of the second transmission scheme table to the terminal(s) (e.g., the first terminal and/or the second terminal) through higher layer signaling (S720). Alternatively, the information of the first transmission scheme table and the information of the second transmission scheme table may be transmitted through one or a combination of two or more among higher layer signaling, MAC signaling, and PHY signaling.

The terminal(s) may be configured to receive the information of the first transmission scheme table and the information of the second transmission scheme table from the base station, and identify the transmission scheme(s) (e.g., the transmission scheme(s) defined in Tables 6 and 7 or the transmission scheme(s) defined in Tables 6 and 8) indicated by the corresponding information. The first terminal may be configured to select a transmission scheme from the first transmission scheme table configured by the base station, and select a transmission scheme from the second transmission scheme table configured by the base station.

The first terminal may be configured to transmit a $1^{st}$-stage SCI including first indication bits indicating the transmission scheme selected from the first transmission scheme table to the second terminal (S730). In addition, the first terminal may be configured to transmit a $2^{nd}$-stage SCI including second indication bits indicating the transmission scheme selected from the second transmission scheme table to the second terminal (S730). In particular, the $2^{nd}$-stage SCI may be transmitted based on the transmission scheme indicated by the first indication bits included in the $1^{st}$-stage SCI. The above-described SCI (e.g., $1^{st}$-stage SCI and/or $2^{nd}$-stage SCI) may further include scheduling information of a PSSCH.

Alternatively, the first terminal transmit, to the second terminal, a $1^{st}$-stage SCI including the first indication bits indicating the transmission scheme selected from the first transmission scheme table and the second indication bits indicating the transmission scheme selected from the second transmission scheme table (S730). In addition, the first terminal may be configured to transmit a $2^{nd}$-stage SCI to the second terminal based on the transmission scheme indicated by the first indication bits included in the $1^{st}$-stage SCI (S730). The above-described SCI (e.g., $1^{st}$-stage SCI and/or $2^{nd}$-stage SCI) may further include scheduling information of a PSSCH.

The second terminal may be configured to receive the $1^{st}$-stage SCI from the first terminal, and identify the information elements (e.g., indication bits, scheduling information, etc.) included in the $1^{st}$-stage SCI. Since the transmission scheme tables are configured for transmission of the $2^{nd}$-stage SCI and PSSCH using multiple layers (e.g., two layers), if indication bits indicating one transmission scheme in the transmission scheme tables is received, the second terminal may be configured to determine that the transmission of the $2^{nd}$-stage SCI and PSSCH is to be performed through multiple layers (e.g., two layers).

The second terminal may be configured to identify the first indication bits included in the $1^{st}$-stage SCI, and receive the $2^{nd}$-stage SCI based on the transmission scheme indicated by the first indication bits. The second terminal may be configured to identify the second indication bits included in the $2^{nd}$-stage SCI. Alternatively, the second terminal may be configured to identify the first indication bits and the second indication bits included in the $1^{st}$-stage SCI, and may be configured to receive the $2^{nd}$-stage SCI based on the transmission scheme indicated by the first indication bits.

After the step S730, the first terminal may be configured to transmit the PSSCH (e.g., sidelink data) to the second terminal based on the information elements included in the SCI (S740). For example, the first terminal may be configured to transmit the PSSCH to the second terminal using the transmission scheme indicated by the second indication bits included in the $1^{st}$-stage SCI or the second indication bits included in the $2^{nd}$-stage SCI. The second terminal may be configured to perform a PSSCH reception operation based on the information elements included in the SCI. For example, the second terminal may be configured to receive the PSSCH based on the transmission scheme indicated by the second indication bits included in the $1^{st}$-stage SCI or the second indication bits included in the $2^{nd}$-stage SCI. The PSSCH may be transmitted and received through multiple layers (e.g., two layers).

Transmission Method #3-2

The base station may configure transmission scheme(s) for a $2^{nd}$-stage SCI and transmission scheme(s) for a PSSCH (S710). For example, the base station may configure a first transmission scheme table for the $2^{nd}$-stage SCI as shown in Table 9 below. The transmission scheme indicated by the first transmission scheme table may be a transmission scheme of the $2^{nd}$-stage SCI. Here, transmission of the $2^{nd}$-stage SCI may be performed through one or more layers (e.g., one layer or two layers).

TABLE 9

| Indication bits | Transmission scheme of $2^{nd}$-stage SCI |
| --- | --- |
| 00 | Transmission scheme #1 (one layer) |
| 01 | Transmission scheme #1 (two layers) |
| 10 | Transmission scheme #2 |
| 11 | Transmission scheme #3 |

In addition, the base station may configure a second transmission scheme table for the PSSCH as shown in Table 10 below. The transmission scheme indicated by the second transmission scheme table may be a transmission scheme of the PSSCH. Here, transmission of the PSSCH may be performed through one or more layers (e.g., one layer or two layers).

TABLE 10

| Indication bits | Transmission scheme of PSSCH |
| --- | --- |
| 00 | Transmission scheme #1 (one layer) |
| 01 | Transmission scheme #1 (two layers) |
| 10 | Transmission scheme #4 |
| 11 | Transmission scheme #5 |

The base station may be configured to transmit information of the first transmission scheme table and information of the second transmission scheme table to the terminal(s) (e.g., the first terminal and/or the second terminal) through higher layer signaling (S720). Alternatively, the information of the first transmission scheme table and the information of the second transmission scheme table may be transmitted through one or a combination of two or more among higher layer signaling, MAC signaling, and PHY signaling.

The terminal(s) may be configured to receive the information of the first transmission scheme table and the information of the second transmission scheme table from the base station, and identify the transmission scheme(s) (e.g., the transmission scheme(s) defined Tables 9 and 10) indicated by the corresponding information. The first terminal may be configured to select a transmission scheme from the first transmission scheme table configured by the base station, and may select a transmission scheme from the second transmission scheme table configured by the base station.

The first terminal may be configured to transmit a $1^{st}$-stage SCI including first indication bits indicating the transmission scheme selected from the first transmission scheme table to the second terminal (S730). In addition, the first terminal may be configured to transmit a $2^{nd}$-stage SCI including second indication bits indicating the transmission scheme selected from the second transmission scheme table to the second terminal (S730). Here, the $2^{nd}$-stage SCI may be transmitted based on the transmission scheme indicated by the first indication bits included in the $1^{st}$-stage SCI. The above-described SCI (e.g., $1^{st}$-stage SCI and/or $2^{nd}$-stage SCI) may further include scheduling information of a PSSCH.

Alternatively, the first terminal transmit, to the second terminal, a $1^{st}$-stage SCI including the first indication bits indicating the transmission scheme selected from the first transmission scheme table and the second indication bits indicating the transmission scheme selected from the second transmission scheme table (S730). In addition, the first terminal may transmit a $2^{nd}$-stage SCI to the second terminal based on the transmission scheme indicated by the first indication bits included in the $1^{st}$-stage SCI (S730). The above-described SCI (e.g., $1^{st}$-stage SCI and/or $2^{nd}$-stage SCI) may further include scheduling information of a PSSCH.

The second terminal may be configured to receive the $1^{st}$-stage SCI from the first terminal, and identify the information elements (e.g., indication bits, scheduling information, etc.) included in the $1^{st}$-stage SCI. The second terminal may be configured to identify the first indication bits included in the $1^{st}$-stage SCI, and receive the $2^{nd}$-stage SCI based on the transmission scheme indicated by the first indication bits. The second terminal may be configured to identify the second indication bit; included in the $2^{nd}$-stage SC. Alternatively, the second terminal may identify the first indication bits and the second indication bits included in the $1^{st}$-stage SCI, and receive the $2^{nd}$-stage SCI based on the transmission scheme indicated by the first indication bits.

After the step S730, the first terminal may be configured to transmit the PSSCH (e.g., sidelink data) to the second terminal based on the information elements included in the SCI (S740). For example, the first terminal may be configured to transmit the PSSCH to the second terminal by using the transmission scheme indicated by the second indication bits included in the $1^{st}$-stage SCI or the second indication bits included in the $2^{nd}$-stage SCI. The second terminal may be configured to perform a PSSCH reception operation based on the information elements included in the SCI. For example, the second terminal may be configured to receive the PSSCH based on the transmission scheme indicated by the second indication bits included in the $1^{st}$-stage SCI or the second indication bits included in the $2^{nd}$-stage SCI. Here, the PSSCH may be transmitted and received through one or more layers (e.g., one layer or two layers).

Meanwhile, in the transmission scheme tables defined in Tables 9 and 10, the transmission scheme #1 may support transmission using one layer and transmission using two layers, and each of the transmission scheme #2 to the transmission scheme #5 may support transmission using two layers. In particular, if the indication bits indicates one of the transmission scheme #2 to the transmission scheme #5, additional signaling for indicating the number of layers may not be required. The second terminal (e.g., receiving terminal) receiving the indication bits indicating one of the transmission scheme #2 to the transmission scheme #5 may know that transmission using two layers is to be performed. In particular, the indication bits indicating the number of layers in the SCI may be used for other purposes.

Transmission Method #3-3

The base station may configure transmission scheme(s) for sidelink communication (S710). For example, the base station may configure a transmission scheme table as shown in Table 11 below. The transmission scheme indicated by the transmission scheme table may be a transmission scheme of a $2^{nd}$-stage SCI and a PSSCH. Here, transmission of the $2^{nd}$-stage SCI and the PSSCH may be performed through one or more layers (e.g., two layers).

TABLE 11

| Indication bits | Transmission scheme of $2^{nd}$-stage SCI | Transmission scheme of PSSCH |
| --- | --- | --- |
| 00 | Transmission scheme #1 (one layer) | Transmission scheme #1 (one layer) |
| 01 | Transmission scheme #1 (one layer) | Transmission scheme #1 (two layers) |
| 10 | Transmission scheme #1 (two layers) | Transmission scheme #1 (two layers) |
| 11 | Transmission scheme #3 | Transmission scheme #5 |

When the transmission scheme #1 is used, transmission of each of the $2^{nd}$-stage SCI and the PSSCH may be performed through one layer or two layers. Indication bits set to '01' in Table 11 may indicate that the $2^{nd}$-stage SCI is to be transmitted through one layer based on the transmission scheme #1, and the PSSCH is to be transmitted through two layers based on the transmission scheme #1. The base station may be configured to transmit information of the transmission scheme table to the terminal(s) (e.g., the first terminal and/or the second terminal) through higher layer signaling (S720). Alternatively, the information of the transmission scheme table and the information of the layer table may be transmitted through one or a combination of two or more among higher layer signaling, MAC signaling, and PHY signaling.

The terminal(s) may be configured to receive the information of the transmission scheme table from the base station, and identify the transmission schemes(s) (e.g., the transmission scheme(s) defined in Table 11) indicated by the corresponding information. The First terminal may be configured to select a transmission scheme from the transmission scheme table configured by the base station. The first terminal may be configured to transmit a $1^{st}$-stage SCI including indication bits indicating the transmission scheme to the second terminal (S730). In addition, in the step S730, the first terminal may use the transmission scheme indicated by the indication bits included in the $1^{st}$-stage SCI to transmit a $2^{nd}$-stage SCI. The SCI transmitted in the step S730 may further include scheduling information of a PSSCH.

The second terminal may be configured to receive the $1^{st}$-stage SCI from the first terminal, and may identify the information elements (e.g., indication bits, scheduling information, etc.) included in the SCI. For example, the second terminal may be configured to identify the transmission scheme of the $2^{nd}$-stage SCI and the PSSCH based on the indication bits included in the $1^{st}$-stage SCI. After receiving the $1^{st}$-stage SCI, the second terminal may be configured to receive the $2^{nd}$-stage SCI based on the transmission scheme indicated by the indication bits included in the $1^{st}$-stage SCI.

After the step S730, the first terminal may be configured to transmit the PSSCH (e.g., sidelink data) to the second terminal based on the information elements included in the SCI (S740). For example, the first terminal may be configured to transmit the PSSCH to the second terminal using the transmission scheme indicated by the indication bits included in the $1^{st}$-stage SCI. The second terminal may be configured to perform a PSSCH reception operation based on the information elements included in the SCI. For example, the second terminal may be configured to receive the PSSCH by using the transmission scheme indicated by the indication bits included in the $1^{st}$-stage SCI. Here, the PSSCH may be transmitted and received through one or more layers (e.g., one layer or two layers).

Transmission Method #3-4

The base station may configure transmission scheme(s) and the number of layer(s) for sidelink communication (S710). For example, the base station may configure a first transmission scheme table as shown in Table 6, a second transmission scheme table as shown in Table 7, and a layer table as shown in Table 5. Alternatively, the base station may configure a first transmission scheme table as shown in Table 6, a second transmission scheme table as shown in Table 8, and a layer table as shown in Table 5. The transmission scheme table(s) may be configured independently from the layer table. The number of layers supported by the transmission scheme indicated by the transmission scheme table(s) may be indicated by the layer table. In other words, the transmission scheme(s) and the number of layer(s) for a $2^{nd}$-stage SCI may be indicated by a combination of the first transmission scheme table and the layer table. The transmission scheme(s) and the number of layer(s) for a PSSCH may be indicated by a combination of the second transmission scheme table and the layer table.

The base station may be configured to transmit information of the first transmission scheme table, information of the second transmission scheme table, and information of the layer table to the terminal(s) (e.g., the first terminal and/or the second terminal) through higher layer signaling (S720). Alternatively, the information of the first transmission scheme table, the information of the second transmission scheme table, and the information of the layer table may be transmitted through one or a combination of two or more among higher layer signaling, MAC signaling, and PHY signaling.

The terminal(s) may be configured to receive the information of the first transmission scheme table, the information of the second transmission scheme table, and the information of the layer table from the base station, and identify the transmission scheme(s) indicated by the corresponding information (e.g., transmission scheme(s) defined in Table 6, Table 7, and/or Table 8) and the number of layer(s) (e.g., the number of layer(s) defined in Table 5). The first terminal may be configured to select a transmission scheme from the first transmission scheme table configured by the base station, select a transmission scheme from the second transmission scheme table configured by the base station, and select the number of layers from the layer table configured by the base station.

The first terminal may be configured to transmit a $1^{st}$-stage SCI including first indication bits indicating the transmission scheme selected from the first transmission scheme table and third indication bits indicating the number of layers selected from the layer table to the second terminal (S730). In addition, the first terminal may be configured to transmit a $2^{nd}$-stage SCI including second indication bits indicating the transmission scheme selected from the second transmission scheme table to the second terminal (S730). In particular, the $2^{nd}$-stage SCI may be transmitted using the transmission scheme indicated by the first indication bits included in the $1^{st}$-stage SCI and the layer(s) indicated by the third indication bits included in the $1^{st}$-stage SCI. The above-described SCI (e.g., $1^{st}$-stage SCI and/or $2^{nd}$-stage SCI) may further include scheduling information of a PSSCH.

Alternatively, the first terminal may be configured to transmit, to the second terminal, the $1^{st}$-stage SCI including first indication bits indicating the transmission scheme selected from the first transmission scheme table, second indication bits indicating the transmission scheme selected from the second transmission scheme table, and the third indication bits indicating the number of layers selected from the layer table (S730). In addition, the first terminal may be configured to transmit the $2^{nd}$-stage SCI to the second terminal using the transmission scheme indicated by the first indication bits included in the $1^{st}$-stage SCI and the layer(s) indicated by the third indication bits included in the $1^{st}$-stage SCI (S730). The above-described SCI (e.g., $1^{st}$-stage SCI and/or $2^{nd}$-stage SCI) may further include scheduling information of a PSSCH.

The second terminal may be configured to receive the $1^{st}$-stage SCI from the first terminal, and identify the information elements (e.g., indication bits, scheduling information, etc.) included in the $1^{st}$-stage SCI. The second terminal may be configured to identify the first indication bits and the third indication bits included in the $1^{st}$-stage SCI, and may receive the $2^{nd}$-stage SCI by using the transmission scheme indicated by the first indication bits and the layer(s) indicated by the third indication bits. The second terminal may be configured to identify the second indication bits included in the $2^{nd}$-stage SCI. Alternatively, the second terminal may be configured to identify the first indication bits, the second indication bits, and the third indication bits included in the $1^{st}$-stage SCI, and receive the $2^{nd}$-stage SCI using the transmission scheme indicated by the first indication bits and the layer(s) indicated by the third indication bits.

After the step S730, the first terminal may be configured to transmit the PSSCH (e.g., sidelink data) to the second terminal based on the information elements included in the SCI (S740). For example, the first terminal may be configured to transmit the PSSCH to the second terminal by using the transmission scheme indicated by the second indication bits included in the $1^{st}$-stage SCI and the layer(s) indicated by the third indication bits included in the $1^{st}$-stage SCI. Alternatively, the first terminal may be configured to transmit the PSSCH to the second terminal using the transmission scheme indicated by the second indication bits included in the $2^{nd}$-stage SCI and the layer(s) indicated by the third indication bits included in the $1^{st}$-stage SCI. The second terminal may be configured to perform a PSSCH reception operation based on the information elements included in the SCI. For example, the second terminal may be configured to receive the PSSCH using 'the transmission scheme indicated by the second indication bits included in the $1^{st}$-stage SCI and the layer(s) indicated by the third indication bits included in the $1^{st}$-stage SCI' or 'the transmission scheme indicated by the second indication bits included in the $2^{nd}$-stage SCI and the layer(s) indicated by the third indication bits included in the IP-stage SCI. In particular, the PSSCH may be received through one or more layers (e.g., one layer or two layers). When sidelink communication is performed through one layer, bits indicating two layers in the SCI may be used for other purposes.

Meanwhile, the above-described transmission methods may be extended and applied as simply combined, partially combined, or extendedly combined. When the PSSCH transmission is performed based on a single SCI, the information elements defined in the above-described transmission methods may be included in the $1^{st}$-stage SCI. In particular, the transmission operation of the $2^{nd}$-stage SCI may not be performed. The above-described transmission methods may be applied to sidelink communication using three or more layers. In addition, when sidelink communication (e.g., V2X communication) is performed in a unicast scheme, information indicating that a diversity mode or a multiplexing mode is used may be signaled together with the information elements defined in the above-described transmission method(s).

The exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a first terminal in a communication system, the operation method comprising:
    generating a first stage sidelink control information (SCI) including first information indicating a number of layers for transmission of sidelink data;
    transmitting the first stage SCI to a second terminal; and
    transmitting the sidelink data to the second terminal through one or more layers indicated by the first information included in the first stage SCI,
    wherein the first information, upon being set to a first value, indicates one layer,
    wherein the first information, upon being set to a second value, indicates two layers, and
    wherein a first transmission scheme for a second stage SCI is configured independently from a second transmission scheme for the sidelink data, the first transmission scheme is a rate matching scheme applied to the second stage SCI, and the second transmission scheme is a rate matching scheme applied to the sidelink data.

2. The operation method according to claim 1, wherein the number indicated by the first information corresponds to a number of demodulation reference signal (DMRS) ports for the sidelink data.

3. The operation method according to claim 1, further comprising receiving, from a base station, information of a first table indicating a number of layers supported in sidelink communication, wherein the first information indicates the number selected from the first table.

4. The operation method according to claim 1, further comprising transmitting the second stage SCI to the second terminal through the one or more layers indicated by the first information included in the first stage SCI.

5. The operation method according to claim 1, wherein the first stage SCI further includes second information indicating the first transmission scheme of the second stage SCI, and the second transmission scheme of the sidelink data is identical to the first transmission scheme indicated by the second information.

6. The operation method according to claim 1, wherein the first stage SCI further includes fourth information indicating both of the first transmission scheme of the second stage SCI and the second transmission scheme of the sidelink data.

7. The operation method according to claim 1, further comprising transmitting, to the second terminal, the second stage SCI including third information indicating the second transmission scheme of the sidelink data, wherein the sidelink data is transmitted based on the second transmission scheme indicated by the third information.

8. An operation method of a second terminal in a communication system, the operation method comprising:
    receiving a first stage sidelink control information (SCI) from a first terminal;
    identifying a number of layers for transmission of sidelink data, which is indicated by first information included in the first stage SCI; and
    receiving the sidelink data from the first terminal through one or more layers indicated by the first information included in the first stage SCI,
    wherein the first information, upon being set to a first value, indicates one layer,
    wherein the first information, upon being set to a second value, indicates two layers, and
    wherein a first transmission scheme for a second stage SCI is configured independently from a second transmission scheme for the sidelink data, the first transmission scheme is a rate matching scheme applied to the second stage SCI, and the second transmission scheme is a rate matching scheme applied to the sidelink data.

9. The operation method according to claim 8, wherein the number indicated by the first information corresponds to a number of demodulation reference signal (DMRS) ports for the sidelink data.

10. The operation method according to claim 8, further comprising receiving from a base station information of a first table indicating a number of layers supported in sidelink communication, wherein the number indicated by the first information belongs to the first table.

11. The operation method according to claim 8, further comprising receiving the second stage SCI from the first terminal through the one or more layers indicated by the first information included in the first stage SCI.

12. The operation method according to claim 8, wherein the first stage SCI further includes second information indicating the first transmission scheme of the second stage SCI, and the second transmission scheme of the sidelink data is identical to the first transmission scheme indicated by the second information.

13. A first terminal in a communication system comprising:
    a processor; and
    a memory storing at least one instruction executable by the processor,
    wherein the at least one instruction causes the first terminal to:
    generate a first stage sidelink control information (SCI) including first information indicating a number of layers for transmission of sidelink data;
    transmit the first stage SCI to a second terminal; and
    transmit the sidelink data to the second terminal through one or more layers indicated by the first information included in the first stage SCI,
    wherein the first information, upon being set to a first value, indicates one layer,
    wherein the first information, upon being set to a second value, indicates two layers, and
    wherein a first transmission scheme for a second stage SCI is configured independently from a second transmission scheme for the sidelink data, the first transmission scheme is a rate matching scheme applied to the second stage SCI, and the second transmission scheme is a rate matching scheme applied to the sidelink data.

14. The first terminal according to claim 13, wherein the number indicated by the first information corresponds to a number of demodulation reference signal (DMRS) ports for the sidelink data.

15. The first terminal according to claim 13, wherein the at least one instruction further causes the first terminal to receive, from a base station, information of a first table indicating a number of layers supported in sidelink communication, wherein the first information indicates the number selected from the first table.

16. The first terminal according to claim 13, wherein the at least one instruction further causes the first terminal to receive, from a base station, information of a second table indicating transmission schemes supported in sidelink communication, wherein the first stage SCI further includes second information indicating the first transmission scheme selected from the second table.

17. The first terminal according to claim 16, wherein the second information indicates a transmission scheme of the second stage SCI, and the second transmission scheme of the sidelink data is identical to the first transmission scheme indicated by the second information.

18. The first terminal according to claim 16, wherein the second information indicates the second transmission scheme of the sidelink data, and the sidelink data is transmitted based on the first transmission scheme indicated by the second information.

\* \* \* \* \*